US008980116B2

(12) United States Patent
Yanagida et al.

(10) Patent No.: US 8,980,116 B2
(45) Date of Patent: Mar. 17, 2015

(54) FERRITE SINTERED MAGNET

(75) Inventors: Shigeki Yanagida, Chuo-ku (JP); Noboru Ito, Chuo-ku (JP); Yuuki Aburakawa, Chuo-ku (JP); Naoki Mori, Chuo-ku (JP); Yoshihiko Minachi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 706 days.

(21) Appl. No.: 12/374,127

(22) PCT Filed: Feb. 27, 2008

(86) PCT No.: PCT/JP2008/053383
§ 371 (c)(1),
(2), (4) Date: Jan. 16, 2009

(87) PCT Pub. No.: WO2008/105449
PCT Pub. Date: Sep. 4, 2008

(65) Prior Publication Data
US 2009/0314981 A1 Dec. 24, 2009

(30) Foreign Application Priority Data

Mar. 1, 2007 (JP) ............... P2007-051723
Aug. 22, 2007 (JP) ............... P2007-216435

(51) Int. Cl.
*C04B 35/26* (2006.01)
*H01F 1/00* (2006.01)
(Continued)

(52) U.S. Cl.
CPC ......... *C04B 35/2633* (2013.01); *C04B 35/2641* (2013.01); *C04B 35/6262* (2013.01);
(Continued)

(58) Field of Classification Search
CPC ................... H01F 1/10; H01F 1/11
USPC ................ 252/62.56–62.57, 62.63
See application file for complete search history.

(56) References Cited

U.S. PATENT DOCUMENTS 6,139,766 A * 10/2000 Taguchi et al. ............ 252/62.57
(Continued)

FOREIGN PATENT DOCUMENTS

EP 1667176 A1 6/2006
(Continued)

OTHER PUBLICATIONS

Topfer J, et al., "Influence of $SiO_2$ and CaO Additions on the Microstructure and Magnetic Properties of Sintered Sr-Hexaferrite," Journal of the European Ceramic Society, Elsevier Science Publishers, Barking, Essex, GB, vol. 25, No. 9, Jun. 1, 2005, pp. 1681-1688.

*Primary Examiner* — Matthew E Hoban
(74) *Attorney, Agent, or Firm* — Drinker Biddle & Reath LLP

(57) ABSTRACT

A sintered ferrite magnet having a ferrite phase with a hexagonal structure as the main phase, wherein the composition of the metal elements composing the main phase is represented by the following general formula (1):

$$R_xCa_mA_{1-x-m}(Fe_{12-y}M_y)_z: \qquad (1),$$

x, m, y and z in formula (1) satisfying all of the conditions represented by the following formulas (2)-(6):

$$0.2 \le x \le 0.5: \qquad (2)$$

$$0.13 \le m \le 0.41: \qquad (3)$$

$$0.7x - m \le 0.15: \qquad (4)$$

$$0.18 \le yz \le 0.31: \qquad (5)$$

$$9.6 \le 12z \le 11.8: \qquad (6),$$

and wherein the density of the sintered ferrite magnet is at least 5.05 g/cm$^3$, and the crystal grains of the sintered ferrite magnet satisfy all of the conditions represented by the following formulas (7) and (8), where L μm is the average for the maximum value and S μm is the average for the minimum value among the diameters passing through the center of gravity of each grains in the crystal cross-section parallel to the c-axis direction of hexagonal structures.

$$L \le 0.95: \qquad (7)$$

$$1.8 \le L/S \le 2.5: \qquad (8).$$

2 Claims, 12 Drawing Sheets

(51) Int. Cl.
*C04B 35/64* (2006.01)
*C04B 35/40* (2006.01)
*C04B 35/626* (2006.01)
*C04B 35/632* (2006.01)
*H01F 1/11* (2006.01)

(52) U.S. Cl.
CPC ........... *C04B35/632* (2013.01); *C04B 2235/32* (2013.01); *C04B 2235/3201* (2013.01); *C04B 2235/3203* (2013.01); *C04B 2235/3206* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3227* (2013.01); *C04B 2235/3229* (2013.01); *C04B 2235/3232* (2013.01); *C04B 2235/3239* (2013.01); *C04B 2235/3241* (2013.01); *C04B 2235/3244* (2013.01); *C04B 2235/3251* (2013.01); *C04B 2235/3256* (2013.01); *C04B 2235/3258* (2013.01); *C04B 2235/3262* (2013.01); *C04B 2235/3277* (2013.01); *C04B 2235/3279* (2013.01); *C04B 2235/3284* (2013.01); *C04B 2235/3286* (2013.01); *C04B 2235/3287* (2013.01); *C04B 2235/3293* (2013.01); *C04B 2235/3294* (2013.01); *C04B 2235/3409* (2013.01); *C04B 2235/3418* (2013.01); *C04B 2235/5409* (2013.01); *C04B 2235/5445* (2013.01); *C04B 2235/605* (2013.01); *C04B 2235/6562* (2013.01); *C04B 2235/72* (2013.01); *C04B 2235/767* (2013.01); *C04B 2235/77* (2013.01); *C04B 2235/785* (2013.01); *C04B 2235/788* (2013.01); *H01F 1/11* (2013.01)
USPC ..................................... 252/62.63; 252/62.57

(56) References Cited

U.S. PATENT DOCUMENTS

| | | | |
|---|---|---|---|
| 7,906,036 B2 * | 3/2011 | Takami et al. | 252/62.63 |
| 2006/0091352 A1 * | 5/2006 | Nagaoka et al. | 252/62.57 |
| 2006/0284136 A1 * | 12/2006 | Takami et al. | 252/62.63 |
| 2007/0009767 A1 * | 1/2007 | Minachi et al. | 428/836.2 |
| 2007/0138432 A1 | 6/2007 | Minachi et al. | |
| 2007/0246681 A1 * | 10/2007 | Minachi et al. | 252/62.63 |
| 2009/0022992 A1 * | 1/2009 | Takami et al. | 428/402 |
| 2009/0218540 A1 * | 9/2009 | Takami et al. | 252/62.57 |
| 2009/0261288 A1 * | 10/2009 | Hosokawa et al. | 252/62.57 |

FOREIGN PATENT DOCUMENTS

| | | | |
|---|---|---|---|
| EP | 1798211 A1 | | 6/2007 |
| JP | 11-154604 | | 6/1999 |
| JP | 2000-195715 | | 7/2000 |
| JP | 2000-223307 | | 8/2000 |
| JP | 2006-104050 | | 4/2006 |
| JP | WO2007105398 | * | 9/2007 |
| KR | 2007-0017466 A | | 2/2007 |
| WO | WO 2005/027153 | | 3/2005 |
| WO | WO 2007/060757 | | 5/2007 |
| WO | WO 2007/077811 | | 7/2007 |

* cited by examiner (a)

(b)

FERRITE SINTERED MAGNET

This application is the National Stage of International Application No. PCT/JP2008/053383, filed Feb. 27, 2008, which claims priority to JP 2007-051723 filed Mar. 1, 2007 and JP 2007-216435 filed Aug. 22, 2007.

TECHNICAL FIELD

The present invention relates to a sintered ferrite magnet.

BACKGROUND ART

Hexagonal Ba ferrite and Sr ferrite are known in the prior art as magnetic materials for use in sintered ferrite magnets. In recent years, magnetoplumbite (M-type) Ba ferrite and Sr ferrite have become the most commonly used ferrites. M-type ferrite is represented by the general formula $AFe_{12}O_{19}$, with Ba or Sr as the element represented by A. M-type ferrites, wherein the element represented by A is Sr with a portion thereof being replaced with a rare earth element and a portion of the Fe being replaced with Co, are known to exhibit excellent magnetic properties including residual flux density and coercive force (for example, see Patent documents 1 and 2). Such M-type ferrites must contain La as the rare earth element. This is because La is the rare earth element that has the highest solubility limit for hexagonal M-type ferrite. Patent documents 1 and 2 also teach that using La as a substitute element for the element represented by A can increase solubility of the Co which is substituting for a portion of the Fe, thus enhancing the magnetic properties as a result.

When the element represented by A in the general formula shown above is Ca which has a smaller ion radius than either Sr or Ba, the crystal structure of hexagonal ferrite is not exhibited and the material cannot be used as a magnetic material. Even when the element represented by A is Ca, however, replacing a portion thereof with La can result in the crystal structure of hexagonal ferrite. Also, it is known that replacing a portion of the Fe with Co causes the sintered ferrite magnet to exhibit a high magnetic property (see Patent document 3). In other words, the magnetic material is M-type ferrite wherein the element represented by A is Ca and a portion thereof is replaced with a rare earth element containing La as an essential component, while a portion of the Fe is replaced with Co.

M-type ferrites wherein the element represented by A is Ca are disclosed in Patent documents 4 and 5 as well as in Patent document 3 cited above. Patent document 4 discloses an oxide magnetic material which comprises, as the main phase, ferrite having a hexagonal M-type structure represented by the following formula (9), with the aim of providing an oxide magnetic material and sintered magnet that improve the residual flux density (Br) and coercive force (HcJ) while also exhibiting a high squareness ratio.

$$(1-x)CaO\cdot(x/2)R_2O_3\cdot(n-y/2)Fe_2O_3\cdot yMO: \quad (9)$$

In formula (9), R is at least one element selected from among La, Nd and Pr and definitely includes La, M is at least one element selected from among Co, Zn, Ni and Mn and definitely includes Co, and the letters x, y and n representing the molar ratios are such satisfying the inequalities $0.4 \leq x \leq 0.6$, $0.2 \leq y \leq 0.35$ and $4 \leq n \leq 6$ and the relational expression $1.4 \leq x/y \leq 2.5$.

Also, Patent document 5 proposes a sintered ferrite magnet having a composition represented by the following general formula (10), with the aim of achieving high coercive force that is not reduced even with small thicknesses, while also maintaining high residual flux density.

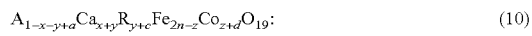

In formula (10), element A represents Sr or Sr and Ba, element R is at least one rare earth element including Y and definitely includes La, while x, y, z and n respectively represent the elements Ca and R and the content and molar ratio of Ca in the calcined body, and a, b, c and d respectively represent the amounts of element A, elements Ca and R and Co which are added during the milling step for the calcined body, with the following conditions:

$0.03 \leq x \leq 0.4$, $0.1 \leq y \leq 0.6$, $0 \leq z \leq 0.4$, $4 \leq n \leq 10$, $x+y<1$,
$0.03 \leq x+b \leq 0.4$, $0.1 \leq y+c \leq 0.6$, $0.1 \leq z+d \leq 0.4$, $0.50 \leq$
$[(1-x-y+a)/(1-y+a+b)] \leq 0.97$, $1.1 \leq (y+c)/(z+d)$
$\leq 1.8$, $1.0 \leq (y+c)/x \leq 20$, $0.1 \leq x/(z+d) \leq 1.2$ being satisfied.

[Patent document 1] Japanese Unexamined Patent Publication HEI No. 11-154604
[Patent document 2] Japanese Unexamined Patent Publication No. 2000-195715
[Patent document 3] Japanese Unexamined Patent Publication HEI No. 12-223307
[Patent document 4] Japanese Unexamined Patent Publication No. 2006-104050
[Patent document 5] International Patent Publication No. WO 2005/027153

DISCLOSURE OF THE INVENTION

Problems to be Solved by the Invention

Sintered ferrite magnets are used as members in motors for automobiles, OA/AV devices and consumer electronic devices, as well as members in sensors and generators. This is because of the high cost performance (magnetic property with respect to production cost) of sintered ferrite magnets compared to other magnets. Recently, however, as demand increases for even smaller sizes of devices employing sintered ferrite magnets and hence smaller sintered ferrite magnets, even more excellent magnetic properties are being required.

The present inventors have studied conventional sintered ferrite magnets in detail, including those described in Patent documents 1-5 mentioned above. We have found, as a result, that such conventional sintered ferrite magnets are in need of further improvement from the viewpoint of their magnetic properties, especially coercive force and residual flux density, in order to meet the requirements demanded of them.

Specifically, in order to exhibit high magnetic properties, sintered ferrite magnets must have high density and their crystal grains must have small sizes. However, the sintered ferrite magnets disclosed in Patent documents 1-3 cannot easily satisfy these demands and have therefore exhibited inadequate magnetic properties.

The sintered ferrite magnets of Patent documents 4 and 5 have a portion of the Sr or Ba replaced with Ca, and therefore also have significant amounts of La or Co incorporated into the crystal structure. As a result, these sintered ferrite magnets have provided superior magnetic properties compared to the sintered ferrite magnets disclosed in Patent documents 1-3, despite having densities or crystal grain sizes equivalent to those disclosed in these documents. Nevertheless, even the ferrites disclosed in Patent documents 4 and 5 have been inadequate for meeting the demands mentioned above.

The present invention has been accomplished in light of the circumstances described above, and its object is to provide a sintered ferrite magnet having superior magnetic properties that can adequately meet recent demands for enhanced magnetic properties.

Means for Solving the Problems

The present inventors have conducted much diligent research with the aim of achieving the object stated above. As a result, the invention has been completed upon the discovery that said object can be achieved by first limiting the composition of a Ca-containing sintered ferrite magnet to within a specified range, reducing the crystal grain size and increasing the magnet density, and controlling the shapes of the crystal grains of the Ca-containing sintered ferrite magnet.

Specifically, the invention provides a sintered ferrite magnet having a ferrite phase with a hexagonal structure as the main phase, wherein the composition of the metal elements composing the main phase is represented by the following general formula (1):

$$R_xCa_mA_{1-x-m}(Fe_{12-y}M_y)_z: \quad (1),$$

x, m, y and z in formula (1) satisfying all of the conditions represented by the following formulas (2), (3), (4), (5) and (6):

$$0.2 \leq x \leq 0.5: \quad (2)$$

$$0.13 \leq m \leq 0.41: \quad (3)$$

$$0.7x - m \leq 0.15: \quad (4)$$

$$0.18 \leq yz \leq 0.31: \quad (5)$$

$$9.6 \leq 12z \leq 11.8: \quad (6),$$

and wherein the density of the sintered ferrite magnet is at least 5.05 g/cm³, and the crystal grains of the sintered ferrite magnet satisfy all of the conditions represented by the following formulas (7) and (8), where L µm is the average for the maximum value and S µm is the average for the minimum value among the diameters passing through the center of gravity of each grains in the crystal cross-section parallel to the c-axis direction of hexagonal structures.

$$L \leq 0.95: \quad (7)$$

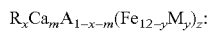

$$1.8 \leq L/S \leq 2.5: \quad (8)$$

In formula (1), R represents at least one element selected from the group consisting of La, Ce, Pr, Nd and Sm and including La as an essential component, A represents Sr and/or Ba, and M represents at least one element selected from the group consisting of Co, Zn, Ni, Mn, Al and Cr and including Co as an essential component. Throughout the present specification, L refers to the "average maximum diameter", S refers to the "average minimum diameter" and L/S refers to the "aspect ratio". The range for the atomic percentages of x, m, y and z is determined based on the composition of the sintered ferrite magnet analyzed after sintering.

According to the present invention, the atomic ratios of the elements R, Ca, A, Fe and M are limited so that the ferrite phase, as the main phase of the sintered ferrite magnet, has the composition represented by general formula (1) above. By thus including Ca and having the prescribed composition, it is possible to increase the magnetic property, in particular the residual flux density Br and coercive force HcJ of the sintered ferrite magnet. The sintered ferrite magnet of the invention can also exhibit a magnetic property superior to the prior art by controlling the magnet density to be at least 5.05 g/cm³ and the average maximum diameter L of the crystal grain in the ferrite phase to be no greater than 0.95 µm. The reason that the magnetic property is enhanced by limiting the average maximum diameter L to no greater than 0.95 µm is thought to be that this increases the proportion of crystal grains that are below the single domain critical size (approximately 1.1 µm in the case of LaCo-substituted M-type Sr ferrite). That is, an increased proportion of particles with small crystal grain sizes reduces the value of the average maximum diameter calculated as the arithmetic mean, although this is not the only factor involved.

Furthermore, if the aspect ratio of the crystal grains in the sintered ferrite magnet of the invention satisfies formula (8) above, the magnet will exhibit a high magnetic property that satisfactorily meets recent demands for improved magnetic properties. Specifically, the sintered ferrite magnet of the invention will be able to exhibit a magnetic property satisfying the conditions represented by the following formulas (11) and (12), in an HcJ (units: Oe)-Br (units: Gauss) plot.

$$Br+0.15HcJ \geq 5325: \quad (11)$$

$$Br+0.1HcJ \geq 5075: \quad (12)$$

The value of Br (units: Gauss)+⅓HcJ (units: Oe), which incorporates both the residual flux density Br and coercive force HcJ, is used as an index for the magnetic property. The sintered ferrite magnet of the invention can exhibit a very high magnetic property represented by a Br+⅓HcJ value of greater than 6350.

The sintered ferrite magnet of the invention has a sufficiently high magnetic property even when the specific element represented by M is reduced, as shown by formula (5) above. The sintered ferrite magnet therefore exhibits high performance at lower cost than the prior art.

Effect of the Invention

According to the invention it is possible to provide a sintered ferrite magnet having superior magnetic properties that can adequately meet recent demands for enhanced magnetic properties.

EXPLANATION OF SYMBOLS

Figure 1:
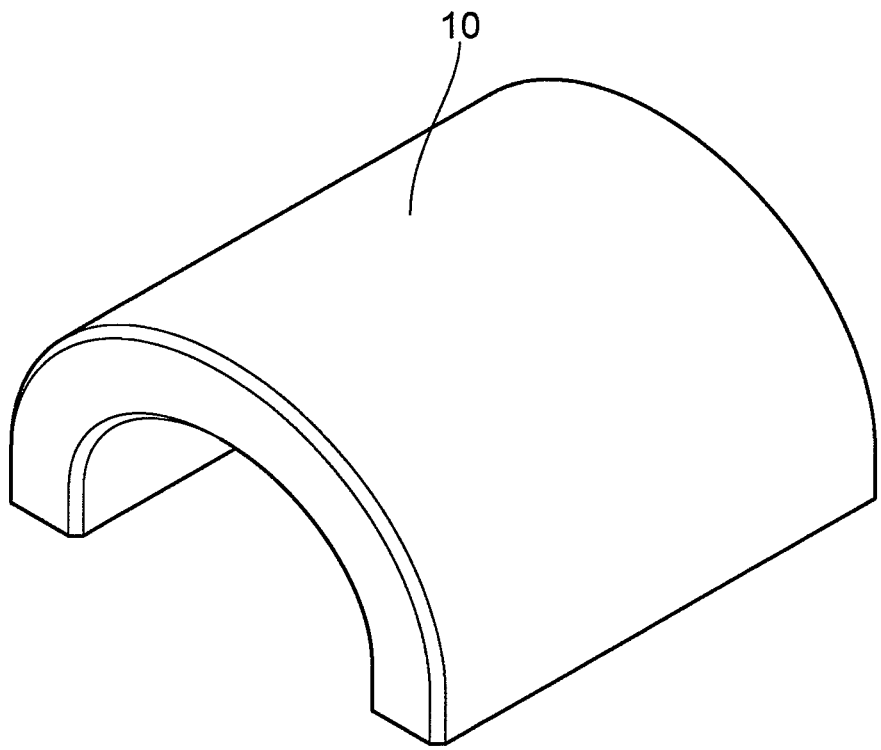
FIG. 1 is a schematic perspective view showing an embodiment of a sintered ferrite magnet according to the invention.

10: Sintered ferrite magnet.

BEST MODE FOR CARRYING OUT THE INVENTION

Preferred embodiments of the invention will now be explained in detail, with reference to the accompanying drawings as necessary. Identical elements in the drawings will be referred to by like reference numerals and will be explained only once. The vertical and horizontal positional relationships are based on the positional relationships in the drawings, unless otherwise specified. Also, the dimensional proportions depicted in the drawings are not necessarily limitative, except for the plot diagrams.

The sintered ferrite magnet of the invention is a sintered ferrite magnet comprising a ferrite phase with a hexagonal structure as the main phase. The composition of the metal elements composing the main phase is represented by general formula (1) above. The composition represented by general formula (1) will now be explained.

R represents at least one element selected from the group consisting of La (lanthanum), Ce (cerium), Pr (praseodymium), Nd (neodymium) and Sm (samarium). However, La is definitely included among these elements, and is most preferred for improving the magnetic property. For the same reason, Pr is also preferred among the aforementioned elements in addition to La.

Preferably, the compositional ratio for each of the elements of R is predominantly La from the viewpoint of more effectively exhibiting an improving effect on the magnetic property. More specifically, the compositional ratio of La in R is preferably 80-100 atomic percent and more preferably 90-100 atomic percent. If the compositional ratio is below this lower limit, substitution of R at the A sites will be reduced compared to when it is within the aforementioned numerical value range, thus tending to lower the magnetic property.

A represents Sr (strontium) and/or Ba (barium). Sr is preferred from the viewpoint of achieving a superior magnetic property. More specifically, the compositional ratio of Sr in A is preferably 50-100 atomic percent and more preferably 75-100 atomic percent.

M represents at least one element selected from the group consisting of Co (cobalt), Zn (zinc), Ni (nickel), Mn (manganese), Al (aluminum) and Cr (chromium). However, Co is definitely included among these elements, and is most preferred for improving the magnetic property. Also, Zn is preferred for improving the residual flux density Br.

Preferably, the compositional ratio for each of the elements of M is predominantly Co from the viewpoint of more effectively exhibiting an improving effect on the magnetic property. More specifically, the compositional ratio of Co in M is preferably 75-100 atomic percent, more preferably 85-100 atomic percent and even more preferably 90-100 atomic percent. If the compositional ratio is below this lower limit, substitution of M at the Fe (iron) sites will be reduced compared to when it is within the aforementioned numerical value range, thus tending to lower the magnetic property.

In formula (1), x, m, 1−x−m, 12−y, y and z respectively represent the atomic ratio of R, Ca (calcium), A, Fe, M and $Fe_{12-y}M_y$. The values of x, m, y and z are such as to satisfy all of the conditions represented by formulas (2), (3), (4), (5) and (6) above.

If x is less than 0.2, substitution of R at the A sites will be reduced and the magnetic property, evidenced by residual flux density Br or coercive force HcJ, will be inferior, compared to when x is within the numerical value range satisfying the condition represented by formula (2) above. If x is greater than 0.5, production of the non-magnetic phase, including orthoferrite, will increase as a result of the R atoms that have not been substituted at the A sites, thus lowering the magnetic property compared to when x is within the numerical value range satisfying the condition represented by formula (2) above. For the same reason, it is more preferred for the condition represented by the following formula (2a) to be satisfied.

$$0.23 \leq x \leq 0.41: \quad (2a)$$

Ca, when present in the composition of the magnetic material, is responsible for improvement in the magnetic property of the sintered ferrite magnet. Specifically, addition of Ca can increase substitution of R at the A sites, while also increasing substitution of M at the Fe sites. This will result in a superior magnetic property of the sintered ferrite magnet. If m is less than 0.13, the effect of improved magnetic property due to Ca will be reduced, compared to when m is within the numerical value range satisfying the condition represented by formula (3) above. Also, an m value of less than 0.13 will require lower solubility of R in the hexagonal ferrite in order to achieve a stable hexagonal ferrite crystal structure. This will also lower the magnetic property of the sintered ferrite magnet. If m is greater than 0.41, on the other hand, the total amounts of R and A in the composition will be lower compared to when m is within the numerical value range satisfying the condition represented by formula (3) above. Lowering the amount of R will reduce substitution of R at the A sites, while lowering the amount of A will facilitate production of $\alpha$-$Fe_2O_3$. In either case, an m value of greater than 0.41 lowers the magnetic property of the magnet. For the same reason, it is more preferred for the condition represented by the following formula (3a) to be satisfied.

$$0.22 \leq m \leq 0.33: \quad (3a)$$

Also, limiting 0.7x−m to no greater than 0.15 can provide a sufficiently excellent magnetic property of the sintered ferrite magnet. Within the range in which 0.7x−m exceeds 0.15, R is in excess of Ca and production of the non-magnetic phase, including orthoferrite, will increase as a result of the R atoms that have not been substituted at the A sites, thus reducing the magnetic property. For the same reason, it is more preferred for the condition represented by the following formula (4a) to be satisfied.

$$0.7x - m \leq 0.05: \quad (4a)$$

If yz is less than 0.18, substitution of M at the Fe sites will be reduced and the magnetic property, evidenced by residual flux density Br or coercive force HcJ, will be lower, compared to when yz is within the numerical value range satisfying the condition represented by formula (5) above. If yz exceeds 0.31, this will exceed the limit for substitution of M at the Fe sites, thus lowering the magnetic property compared to when yz is within the numerical value range satisfying the condition represented by formula (5) above. For the same reason, it is more preferred for the condition represented by the following formula (5a) to be satisfied.

$$0.20 \leq yz \leq 0.30: \quad (5a)$$

If 12z is less than 9.6, the A-site elements in the crystal structure of the hexagonal ferrite phase will be in excess. This will cause the elements represented by A to be discharged from the ferrite main phase, thus unnecessarily increasing the non-magnetic grain boundary component and lowering the magnetic property. If 12z exceeds 11.8, the compositional ratio of Fe with respect to the elements represented by A will increase, thus tending to produce a soft magnetic spinel ferrite phase containing $\alpha\text{-}Fe_2O_3$ or M. The residual flux density HcJ will be reduced as a result. For the same reason, it is more preferred for the condition represented by the following formula (6a) to be satisfied.

$$10.4 \leq 12z \leq 11.1: \quad (6a)$$

The compositional ratio of R and M also preferably satisfies the condition represented by the following formula (13).

$$1.1 \leq x/yz \leq 1.9: \quad (13)$$

According to the prior art, a portion of the Sr in M-type ferrite is replaced with R while a portion of the Fe is replaced by M, and therefore the ratio x/yz is ideally 1. According to this embodiment, however, the coercive force HcJ is improved without impairing the residual flux density Br, in a prescribed range in which x/yz exceeds 1. This tendency is even more notable when R is La and M is Co. More preferably, the condition represented by the following formula (13a) is satisfied.

$$1.1 \leq x/yz \leq 1.7: \quad (13a)$$

General formula (1) above expresses the compositional ratio of R, Ca, A, Fe and M, as the metal elements in the main phase. The sintered ferrite magnet will naturally include O (oxygen) as a constituent element. The composition of the main phase including oxygen is therefore represented by the following general formula (1a).

$$R_x Ca_m A_{1-x-m}(Fe_{12-y}M_y)_z O_{19}: \quad (1a)$$

In the sintered ferrite magnet of the invention, the proportion of the hexagonal M-type ferrite phase (hereinafter also referred to as "M phase") represented by general formula (1a) is preferably at least 95 mol %. The compositional ratio of oxygen is affected by the compositional ratio of each metal element and the valency of each element (ion), and is adjusted to maintain electrical neutrality in the crystal. An oxygen deficiency can be created if a reducing atmosphere is used as the firing atmosphere for the firing step described hereunder. Although the number of oxygen atoms in general formula (1a) above is 19, the number of oxygen atoms may vary somewhat as mentioned above.

The sintered ferrite magnet of the invention may also contain Si (silicon) and/or Ca as accessory components. By including Si and/or Ca as accessory components, it is possible to improve the sintering property, control the magnetic property and adjust the crystal grain size of the sintered compact. The accessory components Si and Ca are present only at the grain boundary. Si is a non-magnetic component and lowers the magnetic property when present in abundance in the sintered ferrite magnet. The Si is therefore preferably present as $SiO_2$ at no greater than 1.5 wt % and more preferably 0.2-0.9 wt %, with respect to the total weight of the sintered ferrite magnet.

The sintered ferrite magnet of the invention contains Ca as a major component of the ferrite main phase. When Ca is added as an accessory component, therefore, the amount of Ca determined for the sintered compact, for example, is the total of the main phase (also, "major component") and the accessory component. Thus, as mentioned above, when Ca is used as an accessory component the Ca atomic ratio m in general formula (1) is a value which also includes the accessory component. Since the range for the atomic ratio m is specified based on the composition determined after sintering, it may of course be applied for both cases with and without using Ca as an accessory component.

The sintered ferrite magnet of the invention may also contain $B_2O_3$ as an accessory component. This can lower the calcination temperature and sintering temperature and is therefore advantageous for production. From the viewpoint of maintaining high saturation magnetization, the $B_2O_3$ content is preferably no greater than 0.5 wt % with respect to the total weight of the sintered ferrite magnet.

The sintered ferrite magnet of the invention also preferably contains no alkali metal elements such as Na (sodium), K (potassium) or Rb (rubidium) from the viewpoint of maintaining high saturation magnetization. However, alkali metal elements may be present as unavoidable impurities. In such cases, they are preferably present at no greater than 1.0 wt % in terms of their oxides ($Na_2O$, $K_2O$, $Rb_2O$) with respect to the total weight of the sintered ferrite magnet.

The sintered ferrite magnet of the invention may also contain oxides of Ga (gallium), In (indium), Li (lithium), Mg (magnesium), Ti (titanium), Zr (zirconium), Ge (germanium), Sn (tin), V (vanadium), Nb (niobium), Ta (tantalum), Sb (antimony), As (arsenic), W (tungsten) or Mo (molybdenum) and the like. Their contents are preferably no greater than 5.0 wt % for gallium oxide, no greater than 3.0 wt % for indium oxide, no greater than 1.0 wt % for lithium oxide, no greater than 3.0 wt % for magnesium oxide, no greater than 3.0 wt % for titanium oxide, no greater than 3.0 wt % for zirconium oxide, no greater than 3.0 wt % for germanium oxide, no greater than 3.0 wt % for tin oxide, no greater than 3.0 wt % for vanadium oxide, no greater than 3.0 wt % for niobium oxide, no greater than 3.0 wt % for tantalum oxide, no greater than 3.0 wt % for antimony oxide, no greater than 3.0 wt % for arsenic oxide, no greater than 3.0 wt % for tungsten oxide and no greater than 3.0 wt % for molybdenum oxide, in terms of oxides of stoichiometric composition, with respect to the total weight of the sintered ferrite magnet.

The density of the sintered ferrite magnet of the invention is at least 5.05 g/cm$^3$ and preferably at least 5.08 g/cm$^3$. According to the invention, adjustment of the ferrite phase composition to one represented by general formula (1) above yields a sintered ferrite magnet having such density. A density of at least 5.05 g/cm$^3$, in combination with other factors, will allow a sufficiently high magnetic property to be obtained. The density of the sintered ferrite magnet is measured by Archimedes' method.

The composition of the sintered ferrite magnet of the invention explained above can be measured by fluorescent X-ray quantitative analysis. The presence of the main phase (hexagonal ferrite phase) in the sintered ferrite magnet of the invention can be confirmed by X-ray diffraction or electron beam diffraction. According to the invention, the abundance ratio (mol %) of the main phase is determined by X-ray diffraction under the following conditions.

X-ray generator: 3 kW, tube voltage: 45 kV, tube current: 40 mA, sampling width: 0.02 deg, scanning speed: 4.00 deg/min, divergence slit: 1.00 deg, scattering slit: 1.00 deg, receiving slit: 0.30 mm.

The abundance ratio of the main phase is calculated by combining powder samples of the M-type ferrite, orthoferrite, hematite and spinel in the prescribed ratio and performing comparative computation from the X-ray diffraction intensity.

In the sintered ferrite magnet of the invention, the average maximum diameter L (units: μm) and average minimum diameter S (units: μm) of the crystal grains of the hexagonal ferrite phase satisfy all of the conditions represented by formulas (7) and (8) above. The average maximum diameter L and average minimum diameter S will now be explained in greater detail with reference to the accompanying drawings.

Figure 11:
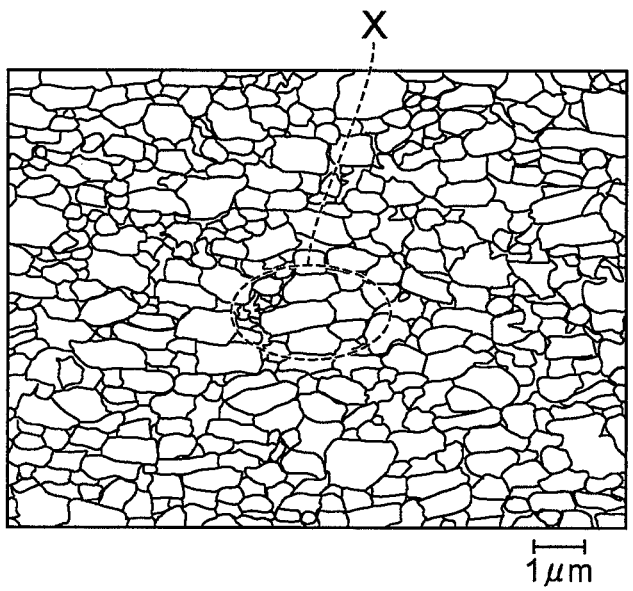
FIG. 11 is a pair of schematic cross-sectional views showing sections of a sintered ferrite magnet according to the invention.
Figure 11:
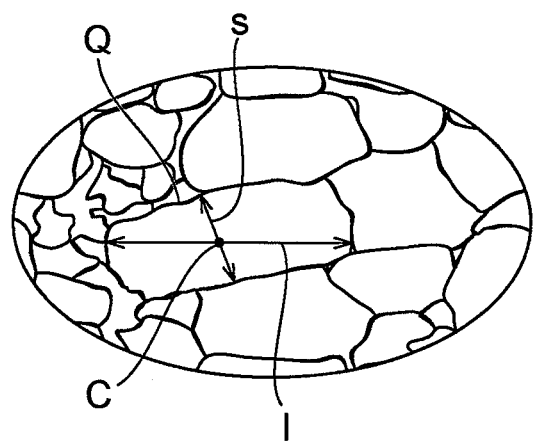

The hexagonal ferrite phase has an easy axis of magnetization in the c-axis direction. In order to measure the average maximum diameter L and average minimum diameter S, first a cross-section of the sintered ferrite magnet is cut parallel to the c-axis direction. Next, the cross-section is subjected to mirror polishing and etching treatment with hydrofluoric acid. The cross-section is then observed with a scanning electron microscope (SEM) and a particle cross-section image is taken. FIG. 11 shows an example of an obtained cross-sectional image as a line drawing. Drawing (a) is a line drawing showing a cross-section parallel to the c-axis direction of the sintered ferrite magnet, and drawing (b) is a magnified line drawing of the area of region X in drawing (a).

Next, the particle cross-section image is processed by image analysis and the maximum and minimum of the diameters passing through the center of gravity in the particle cross-section is calculated for each crystal grain. For example, for crystal grain Q in FIG. 11(b), the maximum 1 (μm) and minimum s (μm) of the diameters passing through the center of gravity C in the particle cross-section are calculated. The arithmetic means are calculated for both the maximum and minimum diameters of 500 crystal grains, and are defined as the average maximum diameter L and average minimum diameter S, respectively.

Limiting the average maximum diameter L to no greater than 0.95 μm can provide sufficiently excellent magnetic properties, and especially coercive force HcJ, for the sintered ferrite magnet. Since the average maximum diameter L represents the arithmetic mean of the maximum diameters l of each of the crystal grains, increasing the proportion of crystal grains smaller than the single domain critical size also reduces the average maximum diameter L. From the viewpoint of further increasing the coercive force, the average maximum diameter L is more preferably no greater than 0.85 μm.

Also, if the aspect ratio L/S is below 1.8 the magnetic orientation of the crystal grains is reduced, thus lowering the magnetic property and especially the residual flux density Br, compared to when the ratio is within the numerical value range satisfying the condition represented by formula (8) above. If the aspect ratio L/S exceeds 2.5, the demagnetizing field is widened, thus lowering the magnetic property and especially the coercive force HcJ, compared to when the ratio is within the numerical value range satisfying the condition represented by formula (8) above. In order to further improve the residual flux density and coercive force the aspect ratio L/S is more preferably 2.0-2.35.

According to the present invention, the atomic ratios of the elements R, Ca, A, Fe and M are limited so that the ferrite phase, as the main phase of the sintered ferrite magnet, has the composition represented by general formula (1) above. By thus including Ca and having the prescribed composition, it is possible to increase the magnetic property of the sintered ferrite magnet, and particularly the residual flux density Br and coercive force HcJ. Such a composition can increase the magnet density to exceed 5.05 g/cm$^3$, and allows the average maximum diameter L of the crystal grains in the ferrite phase to be controlled to no greater than 0.95 μm. Increasing the magnet density tends to also increase the residual flux density Br. If the crystal grains in the ferrite phase are smaller than the single domain critical size, the coercive force HcJ will tend to be improved. For this reason, the sintered ferrite magnet of the invention is able to exhibit more excellent magnetic properties than in the prior art.

Also, if the aspect ratio of the crystal grains satisfies formula (8) above, the magnet will exhibit superior high magnetic properties that satisfactorily meet recent demands for improved magnetic properties. A higher aspect ratio will improve the degree of magnetic orientation while facilitating crystal growth of the ferrite phase in the a-axis direction, and therefore attempting to increase the aspect ratio will increase the diameters of the crystal grains. A higher aspect ratio of the crystal grains also widens the demagnetizing field, thus lowering the coercive force HcJ. It is thought to be for these reasons that limiting the aspect ratio to within the prescribed numerical value range allows superior magnetic properties to be achieved.

The various factors explained above act in combination so that the sintered ferrite magnet of this embodiment satisfies all of the conditions represented by inequalities (11) and (12) above and exhibits a highly superior magnetic property, with Br+⅓HcJ of 6350 or greater.

The sintered ferrite magnet of this embodiment can also maintain a sufficiently high magnetic property even when the specific metal element represented by M, which is relatively expensive, is reduced. The sintered ferrite magnet is therefore a magnet with very high cost performance that can be developed for a wide variety of purposes.

The sintered ferrite magnet of the invention can be used as a member in an automobile motor for a fuel pump, automatic window, ABS (antilock brake system), fan, wiper, power steering, active suspension, starter, door lock, electric-controlled outside mirror or the like. It may also be used as a member in the OA/AV device motor of an FDD spindle, VTR capstan, VTR swivel head, VTR reel, VTR loading mechanism, VTR camera capstan, VTR camera swivel head, VTR camera zoom, VTR camera focus, radio-cassette system capstan or the like, CD/DVD/MD spindle, CD/DVD/MD loading mechanism, CD/DVD optical pickup or the like. In addition, it may be used as a member in the motor of a consumer electronics device such as an air conditioning compressor, freezer compressor, power tool driving mechanism, dryer fan, shaver driving mechanism, electric toothbrush or the like. It can also be used as a member in the FA device motor of a robotic axle, joint-driving mechanism, robotic main driving mechanism, machine tool table driving mechanism, machine tool belt driving mechanism or the like. Its other potential uses include members of motorcycle generators, speaker/headphone magnets, magnetron tubes, MRI magnetic field generators, CD-ROM clampers, distributor sensors, ABS sensors, fuel/oil level sensors, magnetolatches, isolators and the like. Alternatively, it may be used as a target (pellet) during formation of a magnetic recording medium magnetic layer by vapor deposition or sputtering.

FIG. 1 is a schematic perspective view showing an embodiment of a sintered ferrite magnet according to the invention. The sintered ferrite magnet 10 forms a cylinder with an arc-shaped cross-section and has chamfered corners. The sintered ferrite magnet 10 can be suitably used as a motor member, for example. However, the sintered ferrite magnet of the invention is not limited to this shape and may have any shape suited for any of the aforementioned purposes.

A process for production of a sintered ferrite magnet according to this preferred embodiment of the invention will now be explained. The process for production of a sintered ferrite magnet according to the invention comprises a mixing step, a calcining step, a coarse milling step, a fine milling step, a molding step in a magnetic field and a firing step.

<Mixing Step>

In the mixing step, the starting material powders are weighed out in the prescribed proportion and then mixed and milled with a wet attritor or ball mill to obtain a starting composition powder. The mixing and milling time may be appropriately adjusted according to the amount of starting material, and may be about 0.1-20 hours, for example. The starting material may be a compound with one or more metal elements for the sintered ferrite magnet. More specifically, there may be mentioned oxides of the aforementioned metal elements, and hydroxides, carbonates or nitrates of the aforementioned metal elements that can be converted to oxides by firing. There are no particular restrictions on the mean particle size of the starting material, but for most purposes it is preferably about 0.1-2.0 µm. It is not necessary to mix all of the starting materials in the mixing step, and a portion thereof may instead be added and mixed after the calcining step.

<Calcining Step>

In the calcining step, the starting composition powder obtained in the mixing step is calcined to obtain a calcined body. The calcination is normally carried out in an oxidizing atmosphere such as air. The calcination temperature is preferably 1100-1450° C., more preferably 1150-1400° C. and even more preferably 1200-1350° C. The stabilizing time after the calcining step until the start of the milling step is preferably from 1 second to 10 hours, and more preferably from 1 second to 5 hours. The calcined body obtained from the calcining step normally consists of at least 70 mol % M phase. The mean primary particle size of the M phase is preferably no greater than 10 µm and more preferably no greater than 5.0 µm.

<Milling Step>

A calcined body is generally granular or aggregated and cannot be directly molded into desired shapes. In the milling step, therefore, the calcined body is milled into a form that can be molded into the desired shape. By adjusting the milling conditions for the milling step, it is possible to control the average maximum diameter L or aspect ratio L/S of the crystal grains in the ferrite phase. Specifically, if the milling conditions are intensified by lengthening the milling time or increasing the mechanical energy introduced during milling, this tends to reduce the average maximum diameter L and increase the aspect ratio L/S. If the milling conditions are more moderate, this tends to increase the average maximum diameter L and reduce the aspect ratio L/S. The starting material powder and additives may be further added during the milling step in order to adjust the composition of the sintered ferrite magnets as desired. For the purpose of the invention, the starting material powder and additives added after the calcining step will be collectively referred to as "post-additives". Also, the milling step normally includes a coarse milling step and a fine milling step.

<Coarse Milling Step>

In the coarse milling step, the granular or aggregated calcined body is subjected to coarse milling to obtain a coarsely milled material. Since a calcined body is generally granular or aggregated as mentioned above, it is preferred to perform coarse milling of the calcined body that is in that state. The coarse milling is carried out using a known milling apparatus such as a vibrating mill, for example, to a mean particle size of about 0.5-5.0 µm for the coarsely milled material.

<Fine Milling Step>

In the fine milling step, the coarsely milled material is further milled to obtain a finely milled material. The fine milling is carried out using a known milling apparatus such as a wet attritor, ball mill or jet mill, to a finely milled material mean particle size of 0.05-2.0 µm, preferably 0.1-1.0 µm and more preferably 0.1-0.6 µm. The specific surface area (SSA) of the obtained finely milled material is preferably 9-20 m$^2$/g and more preferably 10-15 m$^2$/g. If the SSA is less than 9 m$^2$/g, the reduced degree of fine milling will tend to lower the density, degree of orientation and squareness ratio Hk/HcJ. If the SSA is greater than 20 m$^2$/g, on the other hand, drainage during wet molding will be poor and molding will tend to be difficult. Throughout the present specification, the mean particle size of the finely milled material was determined by observing the finely milled material with a scanning electron microscope (SEM), calculating the maximum diameter for 500 particles by the same method used to calculate the crystal grain diameter of the sintered magnet as described above, and computing the arithmetic mean of the maximum diameters of each of the particles, while the SSA was determined by the BET method. The milling time depends on the milling method, and for example, it may be from 30 minutes to 25 hours when using a wet attritor or about 20-60 hours with wet milling using a ball mill.

In the milling step, the Ca and/or Si components are preferably added to the coarsely milled material and/or finely milled material. For this embodiment, in particular, it is preferred to add $SiO_2$ powder and $CaCO_3$ powder. These post-additives are added for the purpose of improving the sintering property, controlling the magnetic property and adjusting the crystal grain size of the sintered compact.

The post-additives are preferably added in the fine milling step. For this embodiment, it is preferred to add an acyclic saturated polyhydric alcohol represented by the general formula $C_n(OH)_nH_{n+2}$ during the fine milling step in order to increase the degree of magnetic orientation of the sintered compact. In this general formula, n representing the number of carbon atoms is preferably 4-100, more preferably 4-30, even more preferably 4-20 and most preferably 4-12. The acyclic saturated polyhydric alcohol is preferably sorbitol, for example. A single acyclic saturated polyhydric alcohol may be used alone, or a combination of two or more different types may be used in combination. Other known dispersing agents may also be added during the fine milling step, in addition to the acyclic saturated polyhydric alcohol.

An unsaturated polyhydric alcohol and/or cyclic polyhydric alcohol may further be added during the fine milling step, either in addition to or in place of the acyclic saturated polyhydric alcohol. The effect of the invention can be achieved so long as the number of hydroxyl groups in the polyhydric alcohol is at least 50% of the number of carbon atoms n. A greater number of hydroxyl groups is preferred, however, and most preferably the number of hydroxyl groups and carbon atoms is almost the same. The amount of polyhydric alcohol added is preferably 0.05-5.0 wt %, more preferably 0.1-3.0 wt % and even more preferably 0.3-2.0 wt % with respect to the coarsely milled material and finely milled material to which it is added. The added polyhydric alcohol is removed by thermal decomposition in the firing step following the molding step in a magnetic field described hereunder.

A single fine milling treatment is sufficient in the fine milling step. The fine milling step may also include a first fine milling step and a second fine milling step. A powder heat treatment step may also be conducted between the first fine milling step and second fine milling step.

<First Fine Milling Step>

In the first fine milling step, a known milling apparatus such as an attritor, a ball mill or jet mill is used for wet or dry milling of the coarsely milled material to obtain a first finely milled material. The mean particle size of the first finely milled material is preferably 0.08-0.8 µm, more preferably 0.1-0.4 µm and even more preferably 0.1-0.2 µm. The first fine milling step is carried out to minimize the coarse particle sizes and to create a fine composition after sintering in order to enhance the magnetic property. The SSA of the first finely milled material is preferably 18-30 m$^2$/g. The milling time in the first fine milling step will depend on the milling method, but for wet milling of the coarsely milled material with a ball mill it is preferably 60-120 hours for 220 g of coarsely milled material.

In order to improve the coercive force and adjust the diameters of the crystal grains after sintering, a Ca component powder such as $CaCO_3$ and/or a Si component powder such as $SiO_2$ may be added before the first fine milling step. For the same reason, a powder such as $SrCO_3$, $BaCO_3$ or the like may also be added before the first fine milling step.

<Powder Heat Treatment Step>

In the powder heat treatment step, the first finely milled material is heated at 600-1200° C. and more preferably 700-1000° C., preferably for 1 second-100 hours, to obtain a heat treated material. In the steps for production of a sintered ferrite magnet according to the invention, an ultrafine powder of less than 0.1 µm in size is unavoidably obtained from the first fine milling step. The presence of this ultrafine powder can interfere with the molding step in a magnetic field that is subsequently carried out. For example, a large amount of ultrafine powder during wet molding will result in poor drainage and prevent molding. According to this embodiment, therefore, a powder heat treatment step is provided before the molding step in a magnetic field. That is, the powder heat treatment step reduces the amount of ultrafine powder by causing reaction between the ultrafine powder particles smaller than 0.1 µm which are produced during the first fine milling step, and between the ultrafine powder particles and the fine powder with larger diameters (for example, fine powder with diameters of about 0.1-0.2 µm). As a result of this heat treatment, the ultrafine powder is reduced and moldability is improved. The heat treatment atmosphere used may be air.

<Second Fine Milling Step>

In the second fine milling step, a known milling apparatus such as an attritor, a ball mill or jet mill is used for wet or dry milling of the heat treated material to obtain a second finely milled material. The mean particle size of the second finely milled material is preferably no greater than 0.8 µm, more preferably 0.05-0.4 µm and even more preferably 0.1-0.3 µm. The second fine milling step is carried out in order to adjust the particle size, eliminate neck growth and improve the dispersibility of the additives.

The SSA of the second finely milled material is preferably 9-20 m$^2$/g and more preferably 10-15 m$^2$/g. When the SSA is adjusted to within this numerical value range, ultrafine powder will be minimal even if present, thus greatly minimizing its adverse effects on moldability. The first fine milling step and second fine milling step, as well as the powder heat treatment step carried out between them, improve the moldability and further micronize the composition of the sintered ferrite magnet. They can also increase the degree of orientation of the sintered ferrite magnet, thus improving the grain size distribution of the crystal grains.

The milling time will also depend on the milling method, but for wet milling with a ball mill it may be 10-40 hours for 200 g of heat treated material. However, the milling conditions in the second fine milling step are preferably more moderate than the milling conditions in the first fine milling step, i.e., preferably less milling occurs. This is because carrying out the second fine milling step under the same conditions as the first fine milling step will reproduce ultrafine powder, whereas finely milled material having the desired diameter is essentially already obtained in the first fine milling step. Whether the milling conditions are more moderate or not depends not only on the milling time, but may also be judged based on the mechanical energy introduced during the milling.

In order to improve the coercive force and adjust the diameters of the crystal grains after sintering, a Ca component powder such as $CaCO_3$ and/or a Si component powder such as $SiO_2$ may be added before the second fine milling step. For the same reason, a powder such as $SrCO_3$, $BaCO_3$ or the like may also be added before the second fine milling step.

When wet molding is carried out in the molding step in a magnetic field described hereunder, the milling for the fine milling step is performed in a wet system to obtain a slurry containing the finely milled material. The obtained slurry is then concentrated to the prescribed density to form a wet molding slurry. The concentration may be carried out by centrifugal separation, or using a filter press or the like. In this case, the finely milled material preferably constitutes about 30-80 wt % of the wet molding slurry. Water is preferred as the dispersing medium. The dispersing medium may also contain a surfactant such as gluconic acid and/or a gluconic acid salt or sorbitol in addition to water. The dispersing medium is not limited to water and may instead be a nonaqueous dispersing medium. As examples of nonaqueous dispersing media there may be mentioned organic solvents such as toluene or xylene. When a nonaqueous dispersing medium is used, the dispersing medium preferably contains a surfactant such as oleic acid.

<Molding Step in a Magnetic Field>

In the molding step in a magnetic field, dry or wet molding of the finely milled material (the second finely milled material when a second fine milling step is included) is carried out while applying a magnetic field, to obtain a compact. Wet molding is preferred to further increase the degree of magnetic orientation. In the case of wet molding, a wet molding slurry containing the finely milled material is subjected to molding in a magnetic field. The molding pressure is preferably 0.1-0.5 ton/cm$^2$ and the applied magnetic field is preferably 5-15 kOe.

<Firing Step>

In the firing step, the compact is fired to obtain a sintered ferrite magnet as a sintered compact. The firing is normally carried out in an oxidizing atmosphere such as air. Adjustment of the firing conditions for the firing step allows control of the density of the sintered ferrite magnet. For example, the density of the sintered ferrite magnet will be higher with a higher firing temperature or with a longer firing time, while the density will be lower with opposite conditions.

By adjusting the firing conditions for the firing step, it is also possible to control the average maximum diameter L of the crystal grains in the ferrite phase. For example, the average maximum diameter L will be larger with a higher firing temperature and with a longer firing time, while the average maximum diameter L will be smaller with opposite conditions.

The firing temperature is preferably 1100-1220° C. and more preferably 1140-1200° C. If the firing temperature is below this lower limit, the sintering will be insufficient to obtain the desired density, and the saturation flux density Br will tend to be lower. If the firing temperature exceeds this upper limit, on the other hand, the crystal grains will grow excessively creating a greater average maximum diameter L and aspect ratio L/S, and tending to lower the coercive force HcJ and squareness ratio Hk/HcJ. The time for holding at the stabilized firing temperature may be approximately 0.5-3 hours.

When a compact has been obtained by wet molding, abruptly heating it without through drying can potentially cause cracks in the compact. Therefore, at the initial stage of the firing step, it is preferred to gradually remove the dispersing medium such as water from the compact by volatilization. As a specific example, the compact may be heated from room temperature to about 100° C. at a slow temperature-elevating rate of about 10° C./hr for through drying of the compact. This can further inhibit cracking of the compact. When a surfactant or the like is added to the dispersing medium, degreasing treatment is preferably carried out after removal of the dispersing medium. Specifically, a temperature-elevating rate of about 2.5° C./hr may be used in a temperature range of about 100-500° C. during temperature elevation in the firing step. This can more sufficiently accomplish removal of the surfactant.

The conditions for each of the steps in the aforementioned process for production of a sintered ferrite magnet are not limited to those described above, so long as they are in a suitable range to obtain a sintered ferrite magnet according to the invention and allow production of the sintered ferrite magnet.

The embodiments described above are preferred embodiments of the invention, but the invention is not limited thereto. The invention may also be applied in a variety of other embodiments so long as the gist thereof is maintained.

EXAMPLES

The present invention will now be explained in greater detail through the following examples, with the understanding that these examples are in no way limitative on the invention.

(Sample No. 1-28)

First, lanthanum hydroxide ($La(OH)_3$), calcium carbonate ($CaCO_3$), strontium carbonate ($SrCO_3$), iron oxide ($Fe_2O_3$) and cobalt oxide ($Co_3O_4$) powders were prepared as starting materials. The powders were weighed out for each sample so that x, m, 1−x−m, (12−y)z, yz, z, 12z and y of general formula (1) above (hereinafter referred to as "composition of each element") were in the atomic ratios shown in Table 1. Table 1 also shows the atomic ratio of La with respect to Co (x/yz) (same hereunder).

TABLE 1

| Sample No. | La x | Ca m | Sr 1 − x − m | Fe (12 − y)z | Co yz | z | 12z | y | La/Co x/yz |
|---|---|---|---|---|---|---|---|---|---|
| 1 | 0.39 | 0 | 0.61 | 11.70 | 0.30 | 1.00 | 12.00 | 0.30 | 1.30 |
| 2 | 0.45 | 0 | 0.55 | 11.70 | 0.30 | 1.00 | 12.00 | 0.30 | 1.50 |
| 3 | 0.33 | 0.05 | 0.62 | 11.70 | 0.30 | 1.00 | 12.00 | 0.30 | 1.10 |
| 4 | 0.39 | 0.05 | 0.56 | 11.70 | 0.30 | 1.00 | 12.00 | 0.30 | 1.30 |
| 5 | 0.45 | 0.05 | 0.50 | 11.70 | 0.30 | 1.00 | 12.00 | 0.30 | 1.50 |
| 6 | 0.51 | 0.05 | 0.44 | 11.70 | 0.30 | 1.00 | 12.00 | 0.30 | 1.70 |
| 7 | 0.39 | 0.10 | 0.51 | 11.70 | 0.30 | 1.00 | 12.00 | 0.30 | 1.30 |
| 8 | 0.51 | 0.10 | 0.39 | 11.70 | 0.30 | 1.00 | 12.00 | 0.30 | 1.70 |
| 9 | 0.33 | 0.15 | 0.52 | 11.70 | 0.30 | 1.00 | 12.00 | 0.30 | 1.10 |
| 10 | 0.39 | 0.15 | 0.46 | 11.70 | 0.30 | 1.00 | 12.00 | 0.30 | 1.30 |
| 11 | 0.45 | 0.15 | 0.40 | 11.70 | 0.30 | 1.00 | 12.00 | 0.30 | 1.50 |
| 12 | 0.33 | 0.20 | 0.47 | 11.70 | 0.30 | 1.00 | 12.00 | 0.30 | 1.10 |
| 13 | 0.39 | 0.20 | 0.41 | 11.70 | 0.30 | 1.00 | 12.00 | 0.30 | 1.30 |
| 14 | 0.45 | 0.20 | 0.35 | 11.70 | 0.30 | 1.00 | 12.00 | 0.30 | 1.50 |
| 15 | 0.51 | 0.20 | 0.29 | 11.70 | 0.30 | 1.00 | 12.00 | 0.30 | 1.70 |
| 16 | 0.60 | 0.20 | 0.20 | 11.70 | 0.30 | 1.00 | 12.00 | 0.30 | 2.00 |
| 17 | 0.33 | 0.25 | 0.42 | 11.70 | 0.30 | 1.00 | 12.00 | 0.30 | 1.10 |
| 18 | 0.39 | 0.25 | 0.36 | 11.70 | 0.30 | 1.00 | 12.00 | 0.30 | 1.30 |
| 19 | 0.45 | 0.25 | 0.30 | 11.70 | 0.30 | 1.00 | 12.00 | 0.30 | 1.50 |
| 20 | 0.60 | 0.25 | 0.15 | 11.70 | 0.30 | 1.00 | 12.00 | 0.30 | 2.00 |
| 21 | 0.39 | 0.30 | 0.31 | 11.70 | 0.30 | 1.00 | 12.00 | 0.30 | 1.30 |
| 22 | 0.45 | 0.30 | 0.25 | 11.70 | 0.30 | 1.00 | 12.00 | 0.30 | 1.50 |
| 23 | 0.39 | 0.35 | 0.26 | 11.70 | 0.30 | 1.00 | 12.00 | 0.30 | 1.30 |
| 24 | 0.46 | 0.23 | 0.31 | 11.65 | 0.35 | 1.00 | 12.00 | 0.35 | 1.30 |
| 25 | 0.33 | 0.17 | 0.50 | 11.75 | 0.25 | 1.00 | 12.00 | 0.25 | 1.30 |
| 26 | 0.26 | 0.13 | 0.61 | 11.80 | 0.20 | 1.00 | 12.00 | 0.20 | 1.30 |
| 27 | 0.19 | 0.13 | 0.68 | 11.80 | 0.20 | 1.00 | 12.00 | 0.20 | 0.95 |
| 28 | 0.19 | 0.25 | 0.56 | 11.80 | 0.20 | 1.00 | 12.00 | 0.20 | 0.95 |

Next, the starting material powders were mixed and milled with a wet attritor to obtain a slurry-like starting composition. The starting composition was dried and then held in air at 1300° C. for 2.5 hours for calcination treatment to obtain a calcined body. The obtained calcined body was subjected to coarse milling with a mini-rod vibrating mill to obtain a coarsely milled material.

The coarsely milled material was then subjected to two-stage fine milling treatment with a wet ball mill. In the first fine milling step, the coarsely milled material was mixed with water prior to fine milling for 88 hours to obtain a first finely milled material. The first finely milled material was then heated in air at 800° C. for 1 hour to obtain a heat treated material. Next, in the second fine milling step, water and sorbitol were added to the heat treated material and then $CaCO_3$ and $SiO_2$ as an accessory component were added for 25 hours of fine milling with a wet ball mill to obtain a slurry containing the second finely milled material. The amounts of $CaCO_3$ and $SiO_2$ added were adjusted so that the compositions for the elements in general formula (1) above had the atomic ratios listed in Table 2, and so that the content of $SiO_2$ was also as listed in Table 2. Table 2 also shows the atomic ratio of La with respect to Co (x/yz) and the atomic ratio of Ca with respect to Si (same hereunder).

TABLE 2

| Sample No. | La x | Ca m | Sr 1 − x − m | Fe (12 − y)z | Co yz | z | 12z | y | La/Co x/yz | SiO$_2$ wt % | Ca/Si |
|---|---|---|---|---|---|---|---|---|---|---|---|
| 1 | 0.35 | 0.11 | 0.54 | 10.45 | 0.27 | 0.89 | 10.71 | 0.30 | 1.30 | 0.60 | 1.40 |
| 2 | 0.40 | 0.11 | 0.49 | 10.45 | 0.27 | 0.89 | 10.71 | 0.30 | 1.50 | 0.60 | 1.40 |
| 3 | 0.29 | 0.15 | 0.56 | 10.45 | 0.27 | 0.89 | 10.71 | 0.30 | 1.10 | 0.60 | 1.90 |
| 4 | 0.35 | 0.15 | 0.50 | 10.45 | 0.27 | 0.89 | 10.71 | 0.30 | 1.30 | 0.60 | 1.90 |
| 5 | 0.40 | 0.15 | 0.45 | 10.45 | 0.27 | 0.89 | 10.71 | 0.30 | 1.50 | 0.60 | 1.90 |
| 6 | 0.46 | 0.15 | 0.39 | 10.45 | 0.27 | 0.89 | 10.71 | 0.30 | 1.70 | 0.60 | 1.90 |
| 7 | 0.35 | 0.20 | 0.45 | 10.45 | 0.27 | 0.89 | 10.71 | 0.30 | 1.30 | 0.60 | 2.40 |
| 8 | 0.46 | 0.20 | 0.34 | 10.45 | 0.27 | 0.89 | 10.71 | 0.30 | 1.70 | 0.60 | 2.40 |
| 9 | 0.29 | 0.24 | 0.47 | 10.45 | 0.27 | 0.89 | 10.71 | 0.30 | 1.10 | 0.60 | 2.90 |
| 10 | 0.35 | 0.24 | 0.41 | 10.45 | 0.27 | 0.89 | 10.71 | 0.30 | 1.30 | 0.60 | 2.90 |
| 11 | 0.40 | 0.24 | 0.36 | 10.45 | 0.27 | 0.89 | 10.71 | 0.30 | 1.50 | 0.60 | 2.90 |
| 12 | 0.29 | 0.29 | 0.42 | 10.45 | 0.27 | 0.89 | 10.71 | 0.30 | 1.10 | 0.60 | 3.40 |
| 13 | 0.35 | 0.29 | 0.36 | 10.45 | 0.27 | 0.89 | 10.71 | 0.30 | 1.30 | 0.60 | 3.40 |
| 14 | 0.40 | 0.29 | 0.31 | 10.45 | 0.27 | 0.89 | 10.71 | 0.30 | 1.50 | 0.60 | 3.40 |
| 15 | 0.46 | 0.29 | 0.25 | 10.45 | 0.27 | 0.89 | 10.71 | 0.30 | 1.70 | 0.60 | 3.40 |
| 16 | 0.54 | 0.29 | 0.17 | 10.45 | 0.27 | 0.89 | 10.71 | 0.30 | 2.00 | 0.60 | 3.40 |
| 17 | 0.29 | 0.33 | 0.38 | 10.45 | 0.27 | 0.89 | 10.71 | 0.30 | 1.10 | 0.60 | 3.90 |
| 18 | 0.35 | 0.33 | 0.32 | 10.45 | 0.27 | 0.89 | 10.71 | 0.30 | 1.30 | 0.60 | 3.90 |
| 19 | 0.40 | 0.33 | 0.27 | 10.45 | 0.27 | 0.89 | 10.71 | 0.30 | 1.50 | 0.60 | 3.90 |
| 20 | 0.54 | 0.33 | 0.13 | 10.45 | 0.27 | 0.89 | 10.71 | 0.30 | 2.00 | 0.60 | 3.90 |
| 21 | 0.35 | 0.38 | 0.27 | 10.45 | 0.27 | 0.89 | 10.71 | 0.30 | 1.30 | 0.60 | 4.40 |
| 22 | 0.40 | 0.38 | 0.22 | 10.45 | 0.27 | 0.89 | 10.71 | 0.30 | 1.50 | 0.60 | 4.40 |
| 23 | 0.35 | 0.42 | 0.23 | 10.45 | 0.27 | 0.89 | 10.71 | 0.30 | 1.30 | 0.60 | 4.90 |
| 24 | 0.41 | 0.32 | 0.27 | 10.40 | 0.31 | 0.89 | 10.71 | 0.35 | 1.30 | 0.60 | 3.80 |
| 25 | 0.29 | 0.26 | 0.45 | 10.49 | 0.22 | 0.89 | 10.71 | 0.25 | 1.30 | 0.60 | 3.10 |
| 26 | 0.23 | 0.23 | 0.54 | 10.54 | 0.18 | 0.89 | 10.71 | 0.20 | 1.30 | 0.60 | 2.80 |
| 27 | 0.17 | 0.23 | 0.60 | 10.54 | 0.18 | 0.89 | 10.71 | 0.20 | 0.95 | 0.60 | 2.70 |
| 28 | 0.17 | 0.33 | 0.50 | 10.54 | 0.18 | 0.89 | 10.71 | 0.20 | 0.95 | 0.60 | 3.40 |

A portion of the slurry containing the obtained second finely milled material was dried at 100° C., the mean particle size of the second finely milled material remaining after drying was determined by scanning electron microscope (SEM) observation and the SSA was determined by the BET method. As a result, the mean particle sizes of the second finely milled materials of Sample No. 1-27 were 0.2-0.3 μm and the SSA were 10-13 m$^2$/g.

The solid concentration of the slurry containing the second finely milled material was then adjusted and a wet molding machine in a magnetic field was used for molding in a magnetic field to obtain a cylindrical compact with a diameter of 30 mm and a height of 15 mm. The applied magnetic field was 12 kOe. The obtained compact was thoroughly dried in air at room temperature and then fired at 1180° C. for 1 hour to obtain a sintered ferrite magnet as a sintered compact.

The density of the obtained sintered ferrite magnet was measured by Archimedes' method. The composition of the sintered ferrite magnet was determined by fluorescent X-ray quantitative analysis. The magnetic properties of the sintered ferrite magnet (residual flux density Br, coercive force HcJ, squareness ratio Hk/HcJ and degree of orientation) were measured at 25° C. using a B—H tracer with a maximum applied magnetic field of 25 kOe, after working the upper and lower surfaces of the cast. Here, Hk is the external magnetic field intensity at which the flux density is 90% of the residual flux density in the second quadrant of the magnetic hysteresis loop. The degree of orientation was determined from the ratio Br/4πIs between the residual flux density Br and saturation magnetization 4πIs. The average maximum diameter L and average minimum diameter S of the crystal grains in the ferrite phase of the sintered ferrite magnet were measured in the manner described above and used to determine the aspect ratio L/S. The physical properties and magnetic properties of the samples mentioned below were likewise measured in the same manner. The results are shown in Table 3.

TABLE 3

| Sample No. | Density g/cm$^3$ | Average maximum diameter μm | Aspect ratio | HcJ Oe | Br G | Hk/HcJ % | Orientation % | Br$^+$ ⅓HcJ |
|---|---|---|---|---|---|---|---|---|
| 1 | 5.16 | 1.02 | 2.64 | 3974 | 4674 | 93 | 98.5 | 5999 |
| 2 | 5.17 | 1.05 | 2.70 | 3834 | 4686 | 95 | 98.4 | 5964 |
| 3 | 5.13 | 0.82 | 2.22 | 5122 | 4641 | 91 | 97.3 | 6348 |
| 4 | 5.14 | 0.85 | 2.25 | 5184 | 4629 | 93 | 97.3 | 6357 |
| 5 | 5.16 | 0.94 | 2.29 | 5112 | 4651 | 95 | 97.6 | 6355 |
| 6 | 5.16 | 0.96 | 2.55 | 3985 | 4662 | 93 | 98.4 | 5990 |
| 7 | 5.12 | 0.79 | 2.24 | 5306 | 4615 | 90 | 97.4 | 6384 |
| 8 | 5.16 | 0.84 | 2.26 | 5185 | 4632 | 90 | 97.5 | 6360 |
| 9 | 5.11 | 0.68 | 2.25 | 5379 | 4638 | 91 | 97.4 | 6431 |
| 10 | 5.12 | 0.67 | 2.31 | 5713 | 4643 | 92 | 97.8 | 6547 |
| 11 | 5.12 | 0.69 | 2.32 | 5410 | 4669 | 92 | 98.0 | 6472 |
| 12 | 5.12 | 0.67 | 2.20 | 5337 | 4615 | 90 | 97.5 | 6394 |
| 13 | 5.11 | 0.70 | 2.14 | 5679 | 4632 | 92 | 97.9 | 6525 |
| 14 | 5.12 | 0.75 | 2.34 | 5438 | 4623 | 93 | 97.6 | 6436 |
| 15 | 5.15 | 0.79 | 2.39 | 5243 | 4617 | 98 | 97.4 | 6365 |

TABLE 3-continued

| Sample No. | Density g/cm³ | Average maximum diameter μm | Aspect ratio | HcJ Oe | Br G | Hk/HcJ % | Orientation % | Br+⅓HcJ |
|---|---|---|---|---|---|---|---|---|
| 16 | 5.17 | 0.94 | 2.60 | 4230 | 4523 | 95 | 98.1 | 5933 |
| 17 | 5.11 | 0.68 | 2.23 | 5321 | 4605 | 91 | 97.6 | 6379 |
| 18 | 5.12 | 0.69 | 2.29 | 5437 | 4613 | 94 | 97.5 | 6425 |
| 19 | 5.13 | 0.73 | 2.31 | 5309 | 4591 | 95 | 97.6 | 6361 |
| 20 | 5.16 | 0.97 | 2.58 | 4299 | 4550 | 90 | 97.9 | 5983 |
| 21 | 5.12 | 0.68 | 2.27 | 5392 | 4603 | 90 | 97.8 | 6400 |
| 22 | 5.13 | 0.76 | 2.35 | 5253 | 4600 | 96 | 97.8 | 6351 |
| 23 | 5.13 | 0.75 | 2.30 | 4911 | 4567 | 90 | 97.3 | 6204 |
| 24 | 5.14 | 0.70 | 2.28 | 5635 | 4622 | 91 | 97.9 | 6500 |
| 25 | 5.11 | 0.69 | 2.08 | 5576 | 4615 | 93 | 97.8 | 6474 |
| 26 | 5.09 | 0.68 | 2.11 | 5334 | 4608 | 90 | 98.0 | 6386 |
| 27 | 5.08 | 0.80 | 1.75 | 4715 | 4508 | 87 | 97.2 | 6080 |
| 28 | 5.06 | 0.82 | 1.78 | 4524 | 4539 | 80 | 97.5 | 6047 |

Figure 2:
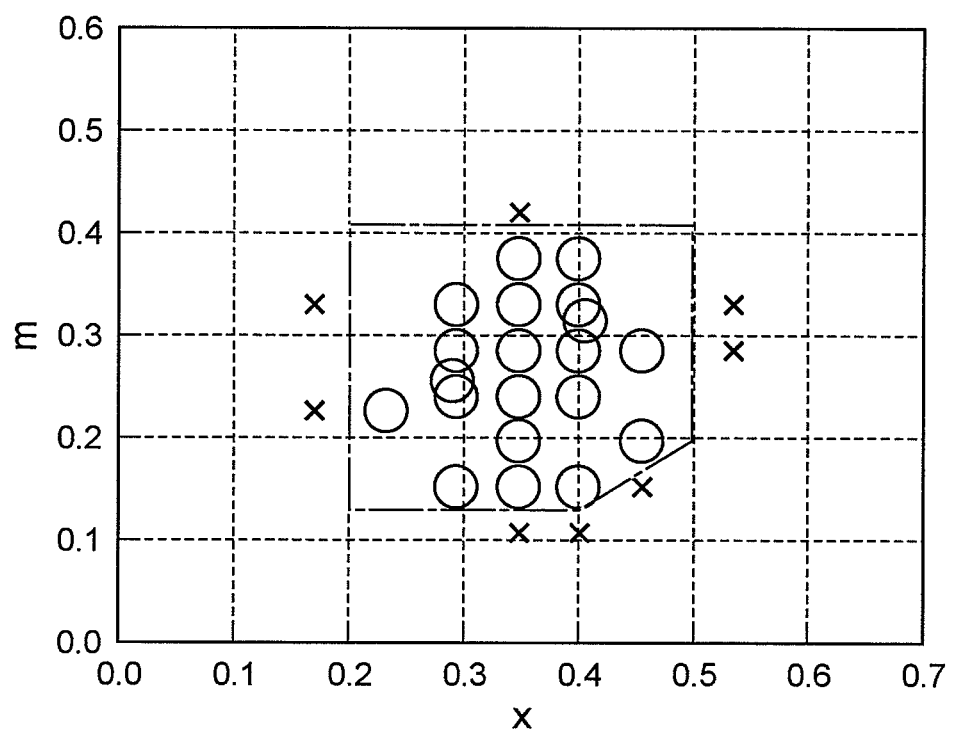
FIG. 2 is an x-m plot diagram for sintered ferrite magnets according to examples and comparative examples.

The sintered ferrite magnets of Sample No. 1, 2, 6, 16, 20, 23, 27 and 28 correspond to comparative examples of the invention, while the other sintered ferrite magnets correspond to examples of the invention. FIG. 2 is a plot of the relationship between the compositional ratios of La and Ca (respectively x and m) for each sample. In this plot, the range delineated by the dash-dot line indicates the range of the invention, with samples of the examples represented by "○" and samples of the comparative examples represented by "×".

Figure 3:
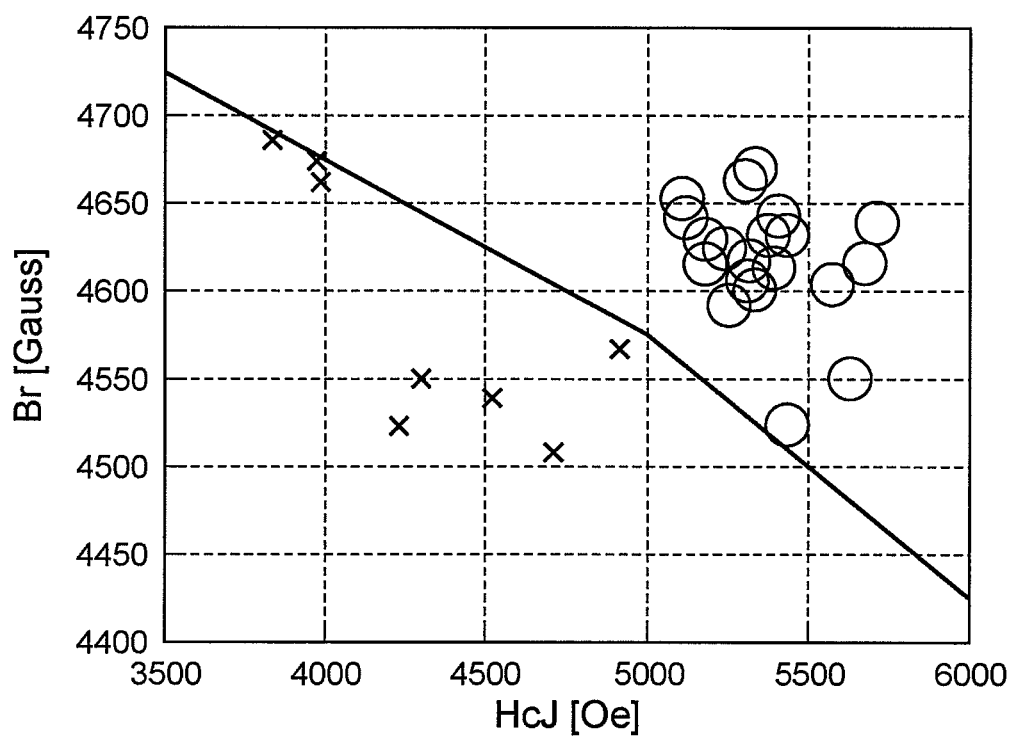
FIG. 3 is an HcJ-Br plot diagram for sintered ferrite magnets according to examples and comparative examples having different elemental compositions.

FIG. 3 is an HcJ-Br plot diagram for the sintered ferrite magnets of Sample No. 1-28. As clearly shown by FIG. 3, the samples of the examples represented by "○" all satisfied the conditions specified by inequalities (11) and (12) above, and exhibited excellent magnetic properties. On the other hand, the samples of the comparative examples represented by "×" failed to satisfy all of the conditions specified by inequalities (11) and (12), and did not exhibit adequate magnetic properties. Therefore, the range for x (La) and m (Ca) satisfying all of the conditions specified by inequalities (11) and (12) was set to $0.2 \leq x \leq 0.5$, $0.13 \leq m \leq 0.41$ and $0.7x-m \leq 0.15$.

Figure 4:
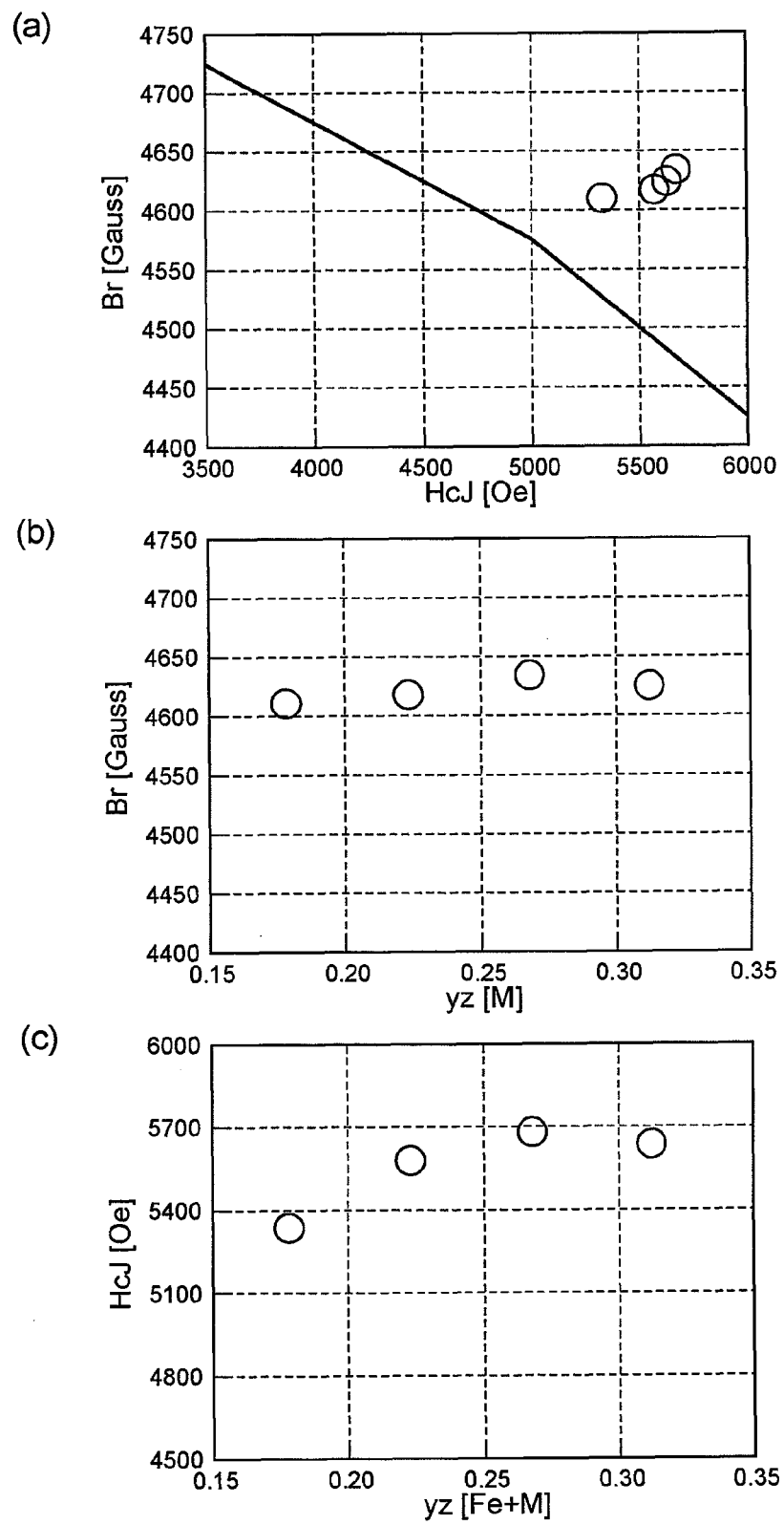
FIG. 4 is a set of plot diagrams representing the correlation between yz, HcJ and Br for sintered ferrite magnets according to examples.

FIG. 4 is a set of plot diagrams showing the change in magnetic properties with different contents of Co as element M. Plot (a) is an HcJ-Br plot, (b) is a yz-Br plot and (c) is a yz-HcJ plot. Based on FIG. 4, the range for yz satisfying all of the conditions specified by inequalities (11) and (12) was set to $0.18 \leq yz \leq 0.31$. Particularly excellent magnetic properties were obtained when yz approached 0.2-0.3.

(Sample No. 29-40)

Sintered ferrite magnets for Sample No. 29-40 were obtained in the same manner as Sample No. 13, except that the milling conditions for the fine milling step were changed and the magnet densities, diameters and SSA were changed. Sample No. 29-34 are cases where the fine milling step included a first fine milling step and a second fine milling step, similar to Sample No. 13, while Sample No. 35-40 were cases where only one fine milling treatment was carried out.

When only one fine milling treatment was carried out, the treatment up to the coarse milling step was the same as for Sample No. 13. Next, water and sorbitol were added to the coarsely milled material and then $CaCO_3$ and $SiO_2$ as an accessory component were added for 25 hours of fine milling with a wet ball mill to obtain a slurry containing the finely milled material. The amounts of $CaCO_3$ and $SiO_2$ added were the same as the amounts in the second fine milling step for Sample No. 13. The obtained slurry was then subjected to the same treatment as Sample No. 13 from the molding step in a magnetic field onward, to obtain sintered ferrite magnets as Sample No. 35-40.

Table 4 shows the physical properties and magnetic properties of the sintered ferrite magnets of Sample No. 35-40. The SSA of the finely milled material in each molding slurry was measured by the BET method before the molding step in a magnetic field, using the finely milled material obtained by drying the slurry sampled after the fine milling step (same hereunder). The mean particle size of each finely milled material was measured by scanning electron microscope (SEM) observation of the finely milled material obtained by drying the slurry in the same manner (same hereunder).

TABLE 4

| Sample No. | SSA of ground material m²/g | Density g/cm³ | Average maximum diameter μm | Aspect ratio | HcJ Oe | Br G | Hk/HcJ % | Orientation % | Br+⅓HcJ |
|---|---|---|---|---|---|---|---|---|---|
| 29 | 8.85 | 5.099 | 0.66 | 1.92 | 5704 | 4632 | 89.9 | 97.3 | 6533 |
| 30 | 9.95 | 5.108 | 0.70 | 2.00 | 5571 | 4625 | 90.6 | 97.6 | 6482 |
| 31 | 10.87 | 5.115 | 0.69 | 2.12 | 5639 | 4634 | 91.5 | 97.8 | 6514 |
| 13 | 11.90 | 5.114 | 0.70 | 2.14 | 5679 | 4632 | 92.3 | 97.9 | 6525 |
| 32 | 13.71 | 5.116 | 0.71 | 2.18 | 5790 | 4624 | 92.0 | 97.9 | 6554 |
| 33 | 16.56 | 5.115 | 0.70 | 2.29 | 5702 | 4606 | 90.8 | 97.9 | 6507 |
| 34 | 20.51 | | | | Unmoldable | | | | |
| 35 | 8.43 | 5.048 | 1.07 | 1.71 | 4883 | 4436 | 83.3 | 95.7 | 6064 |
| 36 | 9.35 | 5.081 | 0.93 | 1.82 | 5418 | 4546 | 85.7 | 96.6 | 6352 |
| 37 | 11.56 | 5.104 | 0.88 | 1.88 | 5537 | 4568 | 88.2 | 96.9 | 6414 |
| 38 | 13.66 | 5.118 | 0.80 | 2.12 | 5688 | 4591 | 89.1 | 97.3 | 6487 |
| 39 | 16.02 | 5.102 | 0.59 | 2.12 | 5613 | 4606 | 88.7 | 97.2 | 6477 |
| 40 | 20.77 | | | | Unmoldable | | | | |

The sintered ferrite magnets of Sample No. 34, 35 and 40 correspond to comparative examples of the invention, while the other sintered ferrite magnets all correspond to examples of the invention. As demonstrated by Sample No. 35, when the SSA of the finely milled material in the molding slurry was less than 8.5 m$^2$/g (a mean particle size of at least 0.4 μm), the density and degree of orientation were significantly reduced and the desired magnetic property could not be obtained. Also, as demonstrated by Sample No. 34 and 40, when the SSA of the finely milled material in the molding slurry was greater than 20 m$^2$/g (a mean particle size of less than 0.1 μm), the draining property during wet molding was notably impaired and a compact could not be obtained. This suggested that the SSA of the finely milled material in the molding slurry is preferably 9-20 m$^2$/g (mean particle size of 0.1-0.4 μm) and more preferably 10-15 m$^2$/g (mean particle size of 0.15-0.3 μm). The results shown in Table 4 indicate that it is preferred to carry out a first fine milling step and second fine milling step in order to obtain a higher magnetic property.

(Sample No. 41-63, 111-130) sintered ferrite magnets for Sample No. 41-63 and 111-130 were obtained in the same manner as Sample No. 13, except that the compositional ratios of La, Ca, Sr and Fe during mixing were changed as listed in Table 5. Table 6 shows the elemental compositions and SiO$_2$ contents after addition of CaCO$_3$ and SiO$_2$ in the fine milling step. Table 7 shows the physical properties and magnetic properties of the sintered ferrite magnets of Sample No. 41-63 and 111-130. The sintered ferrite magnets of Sample No. 41-63 and 111-130 all correspond to examples of the invention.

TABLE 5

| Sample No. | La x | Ca m | Sr 1 − x − m | Fe (12 − y)z | Co yz | z | 12z | y | La/Co x/yz |
|---|---|---|---|---|---|---|---|---|---|
| 111 | 0.33 | 0.15 | 0.52 | 11.30 | 0.30 | 0.97 | 11.60 | 0.31 | 1.10 |
| 112 | 0.33 | 0.15 | 0.52 | 11.50 | 0.30 | 0.98 | 11.80 | 0.31 | 1.10 |
| 9 | 0.33 | 0.15 | 0.52 | 11.70 | 0.30 | 1.00 | 12.00 | 0.30 | 1.10 |
| 113 | 0.33 | 0.15 | 0.52 | 11.90 | 0.30 | 1.02 | 12.20 | 0.30 | 1.10 |
| 114 | 0.33 | 0.15 | 0.52 | 12.10 | 0.30 | 1.03 | 12.40 | 0.29 | 1.10 |
| 41 | 0.39 | 0.15 | 0.46 | 11.30 | 0.30 | 0.97 | 11.60 | 0.31 | 1.30 |
| 42 | 0.39 | 0.15 | 0.46 | 11.50 | 0.30 | 0.98 | 11.80 | 0.31 | 1.30 |
| 43 | 0.39 | 0.15 | 0.46 | 11.70 | 0.30 | 1.00 | 12.00 | 0.30 | 1.30 |
| 44 | 0.39 | 0.15 | 0.46 | 11.90 | 0.30 | 1.02 | 12.20 | 0.30 | 1.30 |
| 45 | 0.39 | 0.15 | 0.46 | 12.10 | 0.30 | 1.03 | 12.40 | 0.29 | 1.30 |
| 46 | 0.45 | 0.15 | 0.40 | 11.30 | 0.30 | 0.97 | 11.60 | 0.31 | 1.50 |
| 47 | 0.45 | 0.15 | 0.40 | 11.50 | 0.30 | 0.98 | 11.80 | 0.31 | 1.50 |
| 48 | 0.45 | 0.15 | 0.40 | 11.70 | 0.30 | 1.00 | 12.00 | 0.30 | 1.50 |
| 49 | 0.45 | 0.15 | 0.40 | 11.90 | 0.30 | 1.02 | 12.20 | 0.30 | 1.50 |
| 50 | 0.45 | 0.15 | 0.40 | 12.10 | 0.30 | 1.03 | 12.40 | 0.29 | 1.50 |
| 115 | 0.33 | 0.20 | 0.47 | 11.30 | 0.30 | 0.97 | 11.60 | 0.31 | 1.10 |
| 116 | 0.33 | 0.20 | 0.47 | 11.50 | 0.30 | 0.98 | 11.80 | 0.31 | 1.10 |
| 12 | 0.33 | 0.20 | 0.47 | 11.70 | 0.30 | 1.00 | 12.00 | 0.30 | 1.10 |
| 117 | 0.33 | 0.20 | 0.47 | 11.90 | 0.30 | 1.02 | 12.20 | 0.30 | 1.10 |
| 118 | 0.33 | 0.20 | 0.47 | 12.10 | 0.30 | 1.03 | 12.40 | 0.29 | 1.10 |
| 51 | 0.39 | 0.20 | 0.41 | 10.50 | 0.30 | 0.90 | 10.80 | 0.33 | 1.30 |
| 52 | 0.39 | 0.20 | 0.41 | 11.00 | 0.30 | 0.94 | 11.30 | 0.32 | 1.30 |
| 53 | 0.39 | 0.20 | 0.41 | 11.30 | 0.30 | 0.97 | 11.60 | 0.31 | 1.30 |
| 54 | 0.39 | 0.20 | 0.41 | 11.50 | 0.30 | 0.98 | 11.80 | 0.31 | 1.30 |
| 13 | 0.39 | 0.20 | 0.41 | 11.70 | 0.30 | 1.00 | 12.00 | 0.30 | 1.30 |
| 55 | 0.39 | 0.20 | 0.41 | 11.90 | 0.30 | 1.02 | 12.20 | 0.30 | 1.30 |
| 56 | 0.39 | 0.20 | 0.41 | 12.10 | 0.30 | 1.03 | 12.40 | 0.29 | 1.30 |
| 57 | 0.39 | 0.20 | 0.41 | 12.40 | 0.30 | 1.06 | 12.70 | 0.28 | 1.30 |
| 58 | 0.39 | 0.20 | 0.41 | 12.90 | 0.30 | 1.10 | 13.20 | 0.27 | 1.30 |
| 59 | 0.45 | 0.20 | 0.35 | 11.30 | 0.30 | 0.97 | 11.60 | 0.31 | 1.50 |
| 60 | 0.45 | 0.20 | 0.35 | 11.50 | 0.30 | 0.98 | 11.80 | 0.31 | 1.50 |
| 61 | 0.45 | 0.20 | 0.35 | 11.70 | 0.30 | 1.00 | 12.00 | 0.30 | 1.50 |
| 62 | 0.45 | 0.20 | 0.35 | 11.90 | 0.30 | 1.02 | 12.20 | 0.30 | 1.50 |
| 63 | 0.45 | 0.20 | 0.35 | 12.10 | 0.30 | 1.03 | 12.40 | 0.29 | 1.50 |
| 119 | 0.33 | 0.25 | 0.42 | 11.30 | 0.30 | 0.97 | 11.60 | 0.31 | 1.10 |
| 120 | 0.33 | 0.25 | 0.42 | 11.50 | 0.30 | 0.98 | 11.80 | 0.31 | 1.10 |
| 17 | 0.33 | 0.25 | 0.42 | 11.70 | 0.30 | 1.00 | 12.00 | 0.30 | 1.10 |
| 121 | 0.33 | 0.25 | 0.42 | 11.90 | 0.30 | 1.02 | 12.20 | 0.30 | 1.10 |
| 122 | 0.33 | 0.25 | 0.42 | 12.10 | 0.30 | 1.03 | 12.40 | 0.29 | 1.10 |
| 123 | 0.39 | 0.25 | 0.36 | 11.30 | 0.30 | 0.97 | 11.60 | 0.31 | 1.30 |
| 124 | 0.39 | 0.25 | 0.36 | 11.50 | 0.30 | 0.98 | 11.80 | 0.31 | 1.30 |
| 18 | 0.39 | 0.25 | 0.36 | 11.70 | 0.30 | 1.00 | 12.00 | 0.30 | 1.30 |
| 125 | 0.39 | 0.25 | 0.36 | 11.90 | 0.30 | 1.02 | 12.20 | 0.30 | 1.30 |
| 126 | 0.39 | 0.25 | 0.36 | 12.10 | 0.30 | 1.03 | 12.40 | 0.29 | 1.30 |
| 127 | 0.45 | 0.25 | 0.30 | 11.30 | 0.30 | 0.97 | 11.60 | 0.31 | 1.50 |
| 128 | 0.45 | 0.25 | 0.30 | 11.50 | 0.30 | 0.98 | 11.80 | 0.31 | 1.50 |
| 19 | 0.45 | 0.25 | 0.30 | 11.70 | 0.30 | 1.00 | 12.00 | 0.30 | 1.50 |
| 129 | 0.45 | 0.25 | 0.30 | 11.90 | 0.30 | 1.02 | 12.20 | 0.30 | 1.50 |
| 130 | 0.45 | 0.25 | 0.30 | 12.10 | 0.30 | 1.03 | 12.40 | 0.29 | 1.50 |

TABLE 6

| Sample No. | La x | Ca m | Sr 1 − x − m | Fe (12 − y)z | Co yz | z | 12z | y | La/Co x/yz | SiO$_2$ wt % | Ca/Si |
|---|---|---|---|---|---|---|---|---|---|---|---|
| 111 | 0.30 | 0.24 | 0.46 | 10.14 | 0.27 | 0.87 | 10.41 | 0.31 | 1.10 | 0.67 | 2.56 |
| 112 | 0.30 | 0.24 | 0.46 | 10.30 | 0.27 | 0.88 | 10.56 | 0.31 | 1.10 | 0.64 | 2.68 |
| 9 | 0.29 | 0.24 | 0.47 | 10.45 | 0.27 | 0.89 | 10.71 | 0.30 | 1.10 | 0.60 | 2.86 |
| 113 | 0.29 | 0.24 | 0.47 | 10.60 | 0.27 | 0.91 | 10.86 | 0.30 | 1.10 | 0.57 | 3.01 |
| 114 | 0.29 | 0.24 | 0.47 | 10.76 | 0.27 | 0.92 | 11.02 | 0.29 | 1.10 | 0.55 | 3.15 |
| 41 | 0.35 | 0.24 | 0.41 | 10.14 | 0.27 | 0.87 | 10.41 | 0.31 | 1.30 | 0.67 | 2.56 |
| 42 | 0.35 | 0.24 | 0.41 | 10.30 | 0.27 | 0.88 | 10.56 | 0.31 | 1.30 | 0.64 | 2.68 |
| 43 | 0.35 | 0.24 | 0.41 | 10.45 | 0.27 | 0.89 | 10.71 | 0.30 | 1.30 | 0.60 | 2.86 |
| 44 | 0.35 | 0.24 | 0.41 | 10.63 | 0.27 | 0.91 | 10.89 | 0.30 | 1.30 | 0.60 | 2.86 |
| 45 | 0.35 | 0.24 | 0.41 | 10.77 | 0.27 | 0.92 | 11.04 | 0.29 | 1.30 | 0.57 | 3.01 |
| 46 | 0.40 | 0.24 | 0.36 | 10.14 | 0.27 | 0.87 | 10.41 | 0.31 | 1.50 | 0.67 | 2.56 |
| 47 | 0.40 | 0.24 | 0.36 | 10.30 | 0.27 | 0.88 | 10.56 | 0.31 | 1.50 | 0.64 | 2.68 |
| 48 | 0.40 | 0.24 | 0.36 | 10.45 | 0.27 | 0.89 | 10.71 | 0.30 | 1.50 | 0.60 | 2.86 |
| 49 | 0.40 | 0.24 | 0.36 | 10.60 | 0.27 | 0.91 | 10.86 | 0.30 | 1.50 | 0.57 | 3.01 |
| 50 | 0.40 | 0.24 | 0.36 | 10.76 | 0.27 | 0.92 | 11.02 | 0.29 | 1.50 | 0.55 | 3.15 |
| 115 | 0.29 | 0.29 | 0.42 | 10.09 | 0.27 | 0.86 | 10.36 | 0.31 | 1.10 | 0.67 | 2.99 |
| 116 | 0.29 | 0.29 | 0.42 | 10.27 | 0.27 | 0.88 | 10.54 | 0.31 | 1.10 | 0.64 | 3.18 |
| 12 | 0.29 | 0.29 | 0.42 | 10.45 | 0.27 | 0.89 | 10.71 | 0.30 | 1.10 | 0.60 | 3.40 |
| 117 | 0.29 | 0.29 | 0.42 | 10.63 | 0.27 | 0.91 | 10.89 | 0.30 | 1.10 | 0.60 | 3.40 |
| 118 | 0.29 | 0.29 | 0.42 | 10.80 | 0.27 | 0.92 | 11.07 | 0.29 | 1.10 | 0.55 | 3.68 |
| 51 | 0.35 | 0.29 | 0.36 | 9.38 | 0.27 | 0.80 | 9.64 | 0.33 | 1.30 | 0.86 | 2.35 |
| 52 | 0.35 | 0.29 | 0.36 | 9.82 | 0.27 | 0.84 | 10.09 | 0.32 | 1.30 | 0.73 | 2.58 |
| 53 | 0.35 | 0.29 | 0.36 | 10.14 | 0.27 | 0.87 | 10.41 | 0.31 | 1.30 | 0.67 | 2.99 |
| 54 | 0.35 | 0.29 | 0.36 | 10.30 | 0.27 | 0.88 | 10.56 | 0.31 | 1.30 | 0.64 | 3.18 |
| 13 | 0.35 | 0.29 | 0.36 | 10.45 | 0.27 | 0.89 | 10.71 | 0.30 | 1.30 | 0.60 | 3.40 |
| 55 | 0.35 | 0.29 | 0.36 | 10.63 | 0.27 | 0.91 | 10.89 | 0.30 | 1.30 | 0.60 | 3.40 |
| 56 | 0.35 | 0.29 | 0.36 | 10.80 | 0.27 | 0.92 | 11.07 | 0.29 | 1.30 | 0.55 | 3.68 |
| 57 | 0.35 | 0.29 | 0.36 | 11.07 | 0.27 | 0.94 | 11.34 | 0.28 | 1.30 | 0.51 | 3.96 |
| 58 | 0.35 | 0.29 | 0.36 | 11.52 | 0.27 | 0.98 | 11.79 | 0.27 | 1.30 | 0.46 | 4.36 |
| 59 | 0.40 | 0.29 | 0.31 | 10.14 | 0.27 | 0.87 | 10.41 | 0.31 | 1.50 | 0.67 | 2.99 |
| 60 | 0.40 | 0.29 | 0.31 | 10.30 | 0.27 | 0.88 | 10.56 | 0.31 | 1.50 | 0.64 | 3.18 |
| 61 | 0.40 | 0.29 | 0.31 | 10.45 | 0.27 | 0.89 | 10.71 | 0.30 | 1.50 | 0.60 | 3.40 |
| 62 | 0.40 | 0.29 | 0.31 | 10.60 | 0.27 | 0.91 | 10.86 | 0.30 | 1.50 | 0.57 | 3.58 |
| 63 | 0.40 | 0.29 | 0.31 | 10.76 | 0.27 | 0.92 | 11.02 | 0.29 | 1.50 | 0.55 | 3.74 |
| 119 | 0.30 | 0.33 | 0.37 | 10.14 | 0.27 | 0.87 | 10.41 | 0.31 | 1.10 | 0.67 | 3.40 |
| 120 | 0.30 | 0.33 | 0.37 | 10.30 | 0.27 | 0.88 | 10.56 | 0.31 | 1.10 | 0.64 | 3.56 |
| 17 | 0.29 | 0.33 | 0.38 | 10.45 | 0.27 | 0.89 | 10.71 | 0.30 | 1.10 | 0.60 | 3.80 |
| 121 | 0.29 | 0.33 | 0.38 | 10.60 | 0.27 | 0.91 | 10.86 | 0.30 | 1.10 | 0.57 | 4.00 |
| 122 | 0.29 | 0.33 | 0.38 | 10.76 | 0.27 | 0.92 | 11.02 | 0.29 | 1.10 | 0.55 | 4.18 |
| 123 | 0.35 | 0.33 | 0.32 | 10.14 | 0.27 | 0.87 | 10.41 | 0.31 | 1.30 | 0.67 | 3.40 |
| 124 | 0.35 | 0.33 | 0.32 | 10.30 | 0.27 | 0.88 | 10.56 | 0.31 | 1.30 | 0.64 | 3.56 |
| 18 | 0.35 | 0.33 | 0.32 | 10.45 | 0.27 | 0.89 | 10.71 | 0.30 | 1.30 | 0.60 | 3.80 |
| 125 | 0.35 | 0.33 | 0.32 | 10.60 | 0.27 | 0.91 | 10.86 | 0.30 | 1.30 | 0.57 | 4.00 |
| 126 | 0.35 | 0.33 | 0.32 | 10.76 | 0.27 | 0.92 | 11.02 | 0.29 | 1.30 | 0.55 | 4.18 |
| 127 | 0.40 | 0.33 | 0.27 | 10.14 | 0.27 | 0.87 | 10.41 | 0.31 | 1.50 | 0.67 | 3.40 |
| 128 | 0.40 | 0.33 | 0.27 | 10.30 | 0.27 | 0.88 | 10.56 | 0.31 | 1.50 | 0.64 | 3.56 |
| 19 | 0.40 | 0.33 | 0.27 | 10.45 | 0.27 | 0.89 | 10.71 | 0.30 | 1.50 | 0.60 | 3.80 |
| 129 | 0.40 | 0.33 | 0.27 | 10.60 | 0.27 | 0.91 | 10.86 | 0.30 | 1.50 | 0.57 | 4.00 |
| 130 | 0.40 | 0.33 | 0.27 | 10.76 | 0.27 | 0.92 | 11.02 | 0.29 | 1.50 | 0.55 | 4.18 |

TABLE 7

| Sample No. | Density g/cm$^3$ | Average maximum diameter μm | Aspect ratio | HcJ Oe | Br G | Hk/HcJ % | Br + ⅓HcJ |
|---|---|---|---|---|---|---|---|
| 111 | 5.11 | 0.69 | 2.30 | 5257 | 4627 | 90 | 6379 |
| 112 | 5.12 | 0.70 | 2.28 | 5338 | 4634 | 90 | 6413 |
| 9 | 5.11 | 0.68 | 2.25 | 5379 | 4638 | 91 | 6431 |
| 113 | 5.11 | 0.68 | 2.26 | 5312 | 4622 | 91 | 6393 |
| 114 | 5.10 | 0.72 | 2.29 | 5266 | 4611 | 91 | 6366 |
| 41 | 5.14 | 0.67 | 2.35 | 5351 | 4613 | 90 | 6397 |
| 42 | 5.13 | 0.65 | 2.22 | 5586 | 4625 | 91 | 6487 |
| 43 | 5.12 | 0.63 | 2.20 | 5578 | 4629 | 91 | 6488 |
| 44 | 5.12 | 0.65 | 2.31 | 5329 | 4633 | 93 | 6409 |
| 45 | 5.12 | 0.68 | 2.28 | 5311 | 4622 | 93 | 6392 |
| 46 | 5.15 | 0.71 | 2.25 | 5358 | 4644 | 91 | 6430 |
| 47 | 5.14 | 0.67 | 2.20 | 5463 | 4621 | 93 | 6442 |
| 48 | 5.13 | 0.65 | 2.17 | 5487 | 4628 | 94 | 6457 |
| 49 | 5.13 | 0.69 | 2.23 | 5387 | 4601 | 96 | 6397 |
| 50 | 5.12 | 0.67 | 2.29 | 5315 | 4588 | 95 | 6360 |
| 115 | 5.13 | 0.75 | 2.27 | 5249 | 4619 | 90 | 6369 |
| 116 | 5.12 | 0.73 | 2.25 | 5312 | 4623 | 90 | 6394 |
| 12 | 5.12 | 0.67 | 2.20 | 5337 | 4615 | 90 | 6394 |
| 117 | 5.11 | 0.68 | 2.20 | 5296 | 4611 | 90 | 6376 |
| 118 | 5.11 | 0.69 | 2.22 | 5266 | 4610 | 91 | 6365 |
| 51 | 5.11 | 0.66 | 2.40 | 5533 | 4610 | 90 | 6454 |
| 52 | 5.10 | 0.65 | 2.19 | 5543 | 4622 | 90 | 6470 |
| 53 | 5.12 | 0.63 | 2.13 | 5565 | 4641 | 91 | 6496 |
| 54 | 5.11 | 0.65 | 2.05 | 5652 | 4650 | 92 | 6534 |
| 13 | 5.11 | 0.70 | 2.14 | 5679 | 4632 | 92 | 6525 |
| 55 | 5.11 | 0.67 | 2.17 | 5573 | 4608 | 93 | 6466 |
| 56 | 5.09 | 0.68 | 2.16 | 5550 | 4590 | 92 | 6440 |
| 57 | 5.10 | 0.66 | 2.27 | 5487 | 4574 | 91 | 6403 |
| 58 | 5.11 | 0.65 | 2.29 | 5400 | 4550 | 90 | 6350 |
| 59 | 5.15 | 0.68 | 2.21 | 5333 | 4610 | 91 | 6388 |
| 60 | 5.14 | 0.64 | 2.20 | 5421 | 4621 | 98 | 6428 |
| 61 | 5.13 | 0.68 | 2.17 | 5506 | 4611 | 96 | 6446 |
| 62 | 5.14 | 0.67 | 2.26 | 5385 | 4608 | 94 | 6403 |
| 63 | 5.13 | 0.72 | 2.23 | 5323 | 4592 | 92 | 6366 |

TABLE 7-continued

| Sample No. | Density g/cm³ | Average maximum diameter μm | Aspect ratio | HcJ Oe | Br G | Hk/HcJ % | Br + ⅓HcJ |
|---|---|---|---|---|---|---|---|
| 119 | 5.12 | 0.70 | 2.25 | 5293 | 4621 | 90 | 6385 |
| 120 | 5.11 | 0.68 | 2.22 | 5346 | 4613 | 91 | 6395 |
| 17  | 5.11 | 0.68 | 2.23 | 5321 | 4605 | 91 | 6379 |
| 121 | 5.11 | 0.69 | 2.26 | 5307 | 4598 | 91 | 6367 |
| 122 | 5.11 | 0.70 | 2.27 | 5295 | 4590 | 93 | 6355 |
| 123 | 5.12 | 0.73 | 2.33 | 5409 | 4629 | 92 | 6432 |
| 124 | 5.12 | 0.70 | 2.30 | 5463 | 4616 | 92 | 6437 |
| 18  | 5.12 | 0.69 | 2.29 | 5437 | 4613 | 94 | 6425 |
| 125 | 5.12 | 0.71 | 2.30 | 5398 | 4606 | 93 | 6405 |
| 126 | 5.11 | 0.69 | 2.32 | 5357 | 4598 | 94 | 6384 |
| 127 | 5.13 | 0.72 | 2.30 | 5381 | 4607 | 92 | 6401 |
| 128 | 5.12 | 0.72 | 2.29 | 5334 | 4594 | 94 | 6372 |
| 19  | 5.13 | 0.73 | 2.31 | 5309 | 4591 | 95 | 6361 |
| 129 | 5.13 | 0.70 | 2.35 | 5291 | 4600 | 95 | 6364 |
| 130 | 5.12 | 0.75 | 2.33 | 5292 | 4593 | 95 | 6357 |

Figure 5:
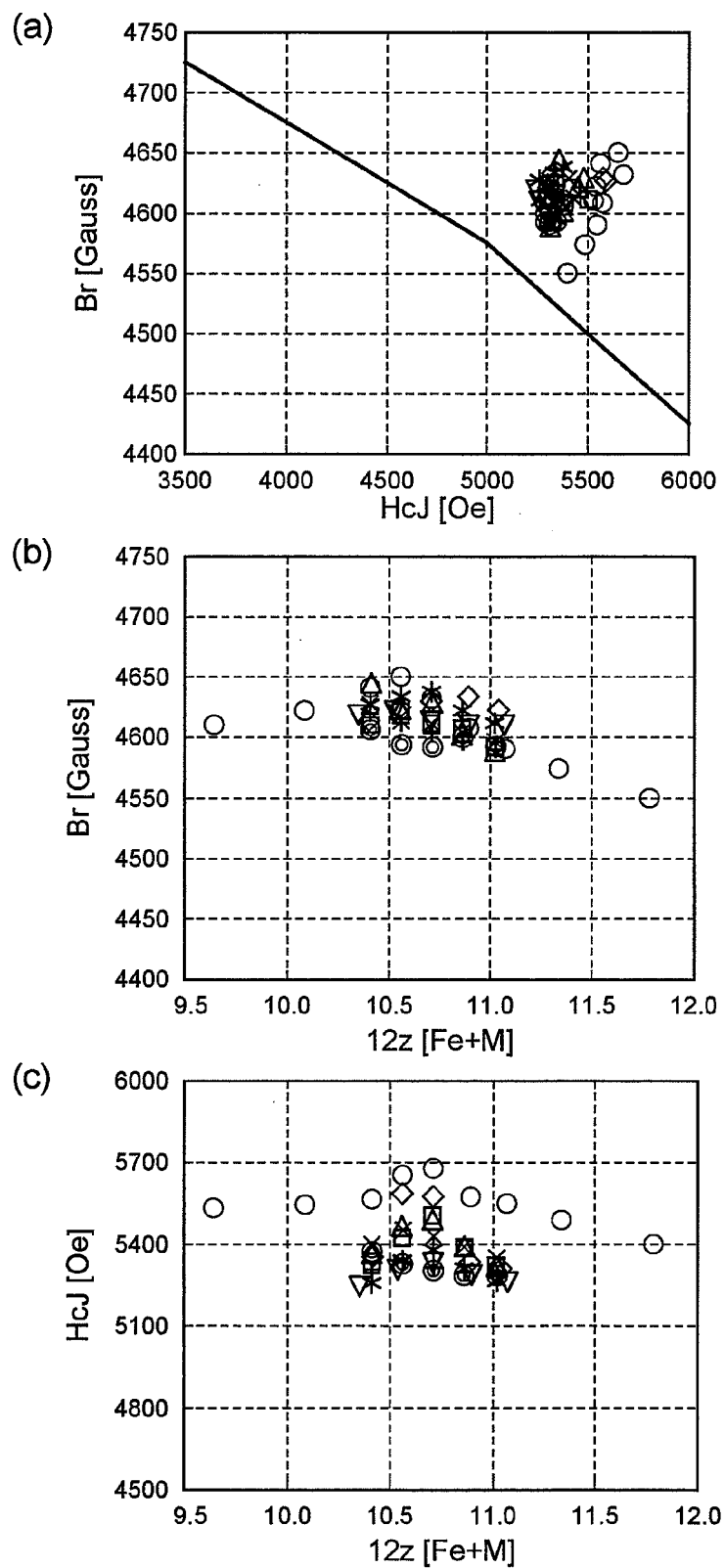
FIG. 5 is a set of plot diagrams representing the correlation between 12z, HcJ and Br for sintered ferrite magnets according to examples.

FIG. 5 is a plot diagram showing the change in magnetic properties with different totals for the composition of Fe and Co as element M. Plot (a) is an HcJ-Br plot, (b) is a 12z-Br plot and (c) is a 12z-HcJ plot. In (a), (b) and (c), "◇" represents plots for samples wherein x=0.35, m=0.24 and 1−x−m=0.41, and "△" represents plots for samples wherein x=0.40, m=0.24 and 1−x−m=0.36. Also, "○" represents plots for samples wherein x=0.35, m=0.29 and 1−x−m=0.36, and "□" represents plots for samples wherein x=0.40, m=0.29 and 1−x−m=0.31. Also, "*" represents plots for samples wherein x=0.30 or 0.29, m=0.24 and 1−x−m=0.46 or 0.47, "∇" represents plots for samples wherein x=0.29, m=0.29 and 1−x−m=0.42, "+" represents plots for samples wherein x=0.30 or 0.29, m=0.33 and 1−x−m=0.37 or 0.38, "×" represents plots for samples wherein x=0.35, m=0.33 and 1−x−m=0.32, and "⊙" represents plots for samples wherein x=0.40, m=0.33 and 1−x−m=0.27. Based on the results, the value of 12z (Fe) satisfying all of the conditions specified by inequalities (11) and (12) was set to 9.6≤12z≤11.8. In order to achieve a higher magnetic property, the range is preferably 10.4≤12z≤11.1.

(Sample No. 64-79, 131-136)

Sintered ferrite magnets for Sample No. 64-79 and 131-136 were obtained in the same manner as Sample No. 13, except for changing the amounts of $CaCO_3$ and $SiO_2$ added in the second fine milling step. The elemental compositions and $SiO_2$ contents for each of the obtained samples are shown in Table 8. Table 9 shows the physical properties and magnetic properties of the sintered ferrite magnets. The sintered ferrite magnets of Sample No. 64-79 and 131-136 all correspond to examples of the invention.

TABLE 8

| Sample No. | La x | Ca m | Sr 1−x−m | Fe (12−y)z | Co yz | z | 12z | y | La/Co x/yz | SiO₂ wt % | Ca/Si |
|---|---|---|---|---|---|---|---|---|---|---|---|
| During mixing* | 0.39 | 0.20 | 0.41 | 11.70 | 0.30 | 1.00 | 12.00 | 0.30 | 1.30 | — | — |
| 131 | 0.38 | 0.22 | 0.40 | 11.47 | 0.29 | 0.98 | 11.76 | 0.30 | 1.30 | 0.20 | 6.70 |
| 132 | 0.37 | 0.24 | 0.39 | 11.08 | 0.28 | 0.95 | 11.37 | 0.30 | 1.30 | 0.25 | 6.40 |
| 64  | 0.37 | 0.24 | 0.39 | 11.14 | 0.29 | 0.95 | 11.43 | 0.30 | 1.30 | 0.30 | 5.14 |
| 65  | 0.36 | 0.25 | 0.39 | 10.93 | 0.28 | 0.93 | 11.21 | 0.30 | 1.30 | 0.30 | 5.54 |
| 66  | 0.37 | 0.24 | 0.39 | 11.14 | 0.29 | 0.95 | 11.43 | 0.30 | 1.30 | 0.40 | 3.86 |
| 67  | 0.36 | 0.27 | 0.37 | 10.73 | 0.28 | 0.92 | 11.01 | 0.30 | 1.30 | 0.40 | 4.46 |
| 68  | 0.37 | 0.24 | 0.39 | 11.14 | 0.29 | 0.95 | 11.43 | 0.30 | 1.30 | 0.50 | 3.08 |
| 69  | 0.36 | 0.25 | 0.39 | 10.93 | 0.28 | 0.90 | 10.84 | 0.30 | 1.30 | 0.50 | 3.32 |
| 70  | 0.35 | 0.27 | 0.38 | 10.64 | 0.27 | 0.91 | 10.91 | 0.30 | 1.30 | 0.50 | 3.80 |
| 71  | 0.35 | 0.29 | 0.36 | 10.45 | 0.27 | 0.89 | 10.71 | 0.30 | 1.30 | 0.50 | 4.04 |
| 72  | 0.36 | 0.27 | 0.37 | 10.73 | 0.28 | 0.92 | 11.01 | 0.30 | 1.30 | 0.60 | 2.97 |
| 13  | 0.35 | 0.29 | 0.36 | 10.45 | 0.27 | 0.89 | 10.71 | 0.30 | 1.30 | 0.60 | 3.37 |
| 73  | 0.34 | 0.30 | 0.36 | 10.26 | 0.26 | 0.88 | 10.53 | 0.30 | 1.30 | 0.60 | 3.57 |
| 74  | 0.35 | 0.27 | 0.38 | 10.64 | 0.27 | 0.91 | 10.91 | 0.30 | 1.30 | 0.70 | 2.72 |
| 75  | 0.35 | 0.29 | 0.36 | 10.45 | 0.27 | 0.89 | 10.71 | 0.30 | 1.30 | 0.70 | 3.06 |
| 76  | 0.34 | 0.30 | 0.36 | 10.17 | 0.26 | 0.87 | 10.43 | 0.30 | 1.30 | 0.70 | 3.23 |
| 77  | 0.33 | 0.32 | 0.35 | 10.00 | 0.26 | 0.85 | 10.26 | 0.30 | 1.30 | 0.70 | 3.40 |
| 78  | 0.35 | 0.29 | 0.36 | 10.45 | 0.27 | 0.89 | 10.71 | 0.30 | 1.30 | 0.80 | 2.53 |
| 79  | 0.34 | 0.30 | 0.36 | 10.17 | 0.26 | 0.87 | 10.43 | 0.30 | 1.30 | 0.80 | 2.83 |
| 133 | 0.32 | 0.34 | 0.34 | 9.64  | 0.25 | 0.82 | 9.88  | 0.30 | 1.30 | 1.00 | 2.70 |
| 134 | 0.33 | 0.33 | 0.34 | 9.75  | 0.25 | 0.83 | 10.00 | 0.30 | 1.30 | 1.00 | 2.60 |
| 135 | 0.33 | 0.33 | 0.34 | 9.87  | 0.25 | 0.84 | 10.12 | 0.30 | 1.30 | 1.00 | 2.50 |
| 136 | 0.31 | 0.38 | 0.31 | 9.77  | 0.24 | 0.83 | 10.02 | 0.29 | 1.30 | 1.50 | 2.20 |

During mixing*: Composition in mixing step.

TABLE 9

| Sample No. | Density g/cm³ | Average maximum diameter μm | Aspect ratio | HcJ Oe | Br G | Hk/HcJ % | Orientation % | Br + ⅓HcJ |
|---|---|---|---|---|---|---|---|---|
| 131 | 5.15 | 0.90 | 2.37 | 5033 | 4678 | 95 | 98.5 | 6356 |
| 132 | 5.14 | 0.84 | 2.32 | 5145 | 4661 | 97 | 98.4 | 6376 |
| 64  | 5.15 | 0.78 | 2.18 | 5298 | 4638 | 95 | 98.1 | 6404 |
| 65  | 5.14 | 0.81 | 2.27 | 5150 | 4639 | 92 | 98.0 | 6356 |
| 66  | 5.15 | 0.65 | 1.95 | 5630 | 4547 | 96 | 97.9 | 6424 |
| 67  | 5.13 | 0.75 | 2.20 | 5496 | 4651 | 92 | 98.0 | 6483 |

TABLE 9-continued

| Sample No. | Density g/cm³ | Average maximum diameter μm | Aspect ratio | HcJ Oe | Br G | Hk/HcJ % | Orientation % | Br + ⅓HcJ |
|---|---|---|---|---|---|---|---|---|
| 68 | 5.14 | 0.72 | 1.83 | 5661 | 4540 | 91 | 97.8 | 6427 |
| 69 | 5.14 | 0.66 | 2.08 | 5557 | 4581 | 91 | 98.0 | 6433 |
| 70 | 5.13 | 0.74 | 2.25 | 5769 | 4639 | 91 | 98.0 | 6562 |
| 71 | 5.13 | 0.82 | 2.33 | 5182 | 4660 | 90 | 98.2 | 6387 |
| 72 | 5.13 | 0.76 | 2.22 | 5370 | 4590 | 92 | 98.0 | 6380 |
| 13 | 5.11 | 0.70 | 2.14 | 5679 | 4632 | 92 | 97.9 | 6525 |
| 73 | 5.12 | 0.71 | 2.25 | 5547 | 4666 | 91 | 98.0 | 6515 |
| 74 | 5.12 | 0.80 | 2.24 | 5315 | 4590 | 95 | 98.1 | 6362 |
| 75 | 5.12 | 0.64 | 2.24 | 5819 | 4640 | 93 | 98.2 | 6580 |
| 76 | 5.12 | 0.66 | 2.36 | 6057 | 4667 | 91 | 98.3 | 6686 |
| 77 | 5.12 | 0.76 | 2.48 | 5148 | 4642 | 90 | 98.4 | 6358 |
| 78 | 5.12 | 0.66 | 2.21 | 5576 | 4551 | 93 | 98.1 | 6410 |
| 79 | 5.11 | 0.73 | 2.31 | 5685 | 4611 | 91 | 98.2 | 6506 |
| 133 | 5.11 | 0.67 | 2.29 | 5685 | 4563 | 90 | 98.4 | 6458 |
| 134 | 5.10 | 0.68 | 2.23 | 5744 | 4549 | 92 | 98.5 | 6464 |
| 135 | 5.10 | 0.65 | 2.11 | 5531 | 4537 | 93 | 98.3 | 6381 |
| 136 | 5.09 | 0.63 | 2.25 | 5792 | 4534 | 93 | 98.5 | 6465 |

Figure 6:
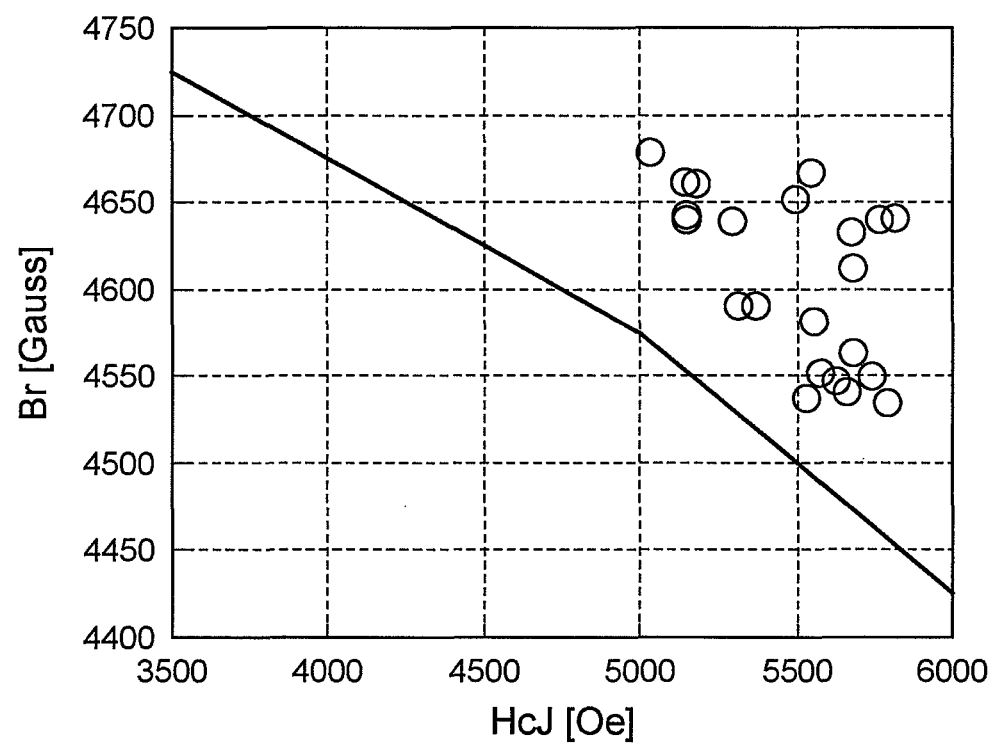
FIG. 6 is an HcJ-Br plot diagram for sintered ferrite magnets according to examples with different amounts of $CaCO_3$ and $SiO_2$ addition.

FIG. 6 is a plot diagram showing the HcJ-Br plots for the sintered ferrite magnets. As seen in these diagrams, the sintered ferrite magnets of the invention exhibited adequately superior magnetic properties even when the amounts of $CaCO_3$ and $SiO_2$ added in the fine milling step were changed.

(Sample No. 80, 81)

A sintered ferrite magnet for Sample No. 81 was produced under the same conditions as the production process described in Example 9 of Patent document 5, except that the same shape was used as for Sample No. 13. A sintered ferrite magnet for Sample No. 80 was also produced under the same conditions as Sample No. 81, except that the fine milling step was divided into the aforementioned first fine milling step and second fine milling step. The Ca and Si contents, physical properties and magnetic properties of the obtained sintered ferrite magnet are shown in Table 10. The wt % values for Ca and Si in the mixing step and fine milling step, shown in Table 10, are the values in terms of $CaCO_3$ for Ca and $SiO_2$ for Si.

sintered ferrite magnets for Sample No. 137, 140 and 143 were produced in the same manner as Sample No. 13, 25 and 26, except that a portion of the La was switched to Nd for R. In addition, sintered ferrite magnets for Sample No. 138, 141 and 144 were produced in the same manner as Sample No. 13, 25 and 26, except that a portion of the La was switched to Ce for R. Sintered ferrite magnets for Sample No. 139, 142 and 145 were also produced in the same manner as Sample No. 13, 25 and 26, except that a portion of the La was switched to Sm for R.

Figure 7:
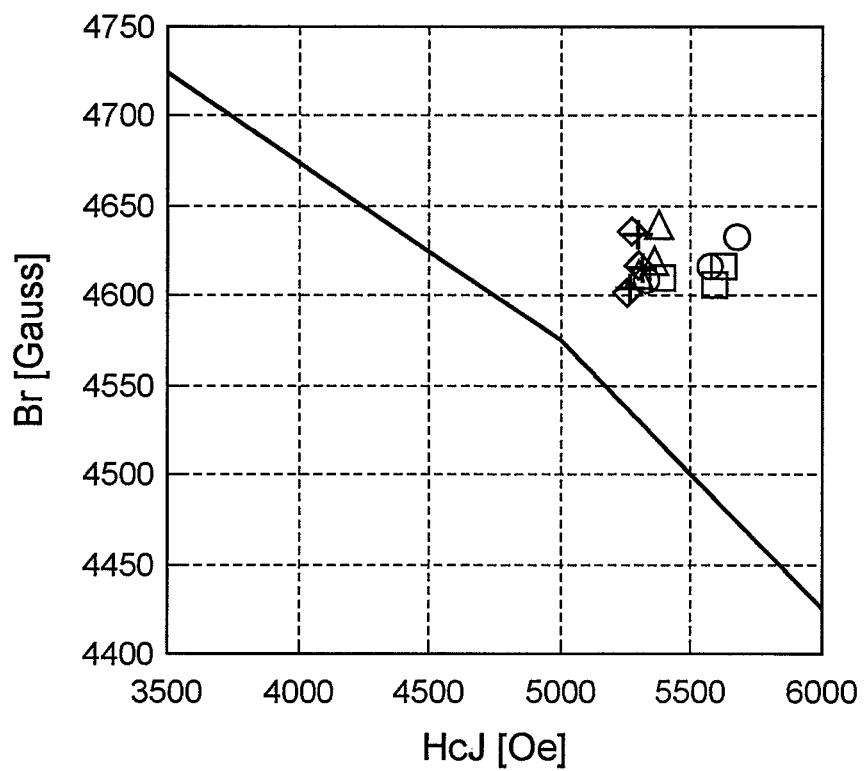
FIG. 7 is an HcJ-Br plot diagram for sintered ferrite magnets according to examples having different R compositions.

Table 11 shows the elemental compositions used in the mixing step, Table 12 shows the elemental compositions of the obtained sintered ferrite magnets, and Table 13 shows the physical properties and magnetic properties of the sintered ferrite magnets. FIG. 7 shows an HcJ-Br plot for the sintered ferrite magnets. In this drawing, "○" represents magnets employing only La as R (Sample No. 13, 25 and 26), "□"

TABLE 10

| Sample No. | Mixing step wt % | | Fine grinding step wt % | | | SSA of ground material m²/g | Density g/cm³ | Average maximum diameter μm | Aspect ratio | HcJ Oe | Br G | Hk/HcJ % | Orientation % | Br + ⅓HcJ |
|---|---|---|---|---|---|---|---|---|---|---|---|---|---|---|
| | Ca | Si | Ca | Si | Ca/Si | | | | | | | | | |
| 13 | 2.0 | 0.0 | 1.4 | 0.6 | 3.4 | 11.90 | 5.11 | 0.70 | 2.14 | 5679 | 4632 | 92 | 98.5 | 6525 |
| 80 | 1.0 | 0.2 | 0.8 (+$SrCO_3$: 0.5) | 0.3 | 3.6 | 10.19 | 5.15 | 1.15 | 2.88 | 2521 | 4570 | 94 | 99.0 | 5410 |
| 81 | 1.0 | 0.2 | 0.8 (+$SrCO_3$: 0.5) | 0.3 | 3.6 | 7.90 | 5.10 | 1.27 | 2.34 | 3524 | 4382 | 91 | 97.5 | 5557 |

According to Table 10, the sintered ferrite magnets of the invention exhibited notably superior magnetic properties (Br and HcJ) compared to the sintered ferrite magnet described in Patent document 5.

(Sample No. 82-84 and 137-145)

Sintered ferrite magnets for Sample No. 82, 83 and 84 were produced in the same manner as Sample No. 13, 25 and 26, except that a portion of the La was switched to Pr for R. Also, represents magnets employing La and Pr as R (Sample No.82-84), "Δ" represents magnets employing La and Nd as R (Sample No. 137, 140 and 143), "◇" represents magnets employing La and Ce as R (Sample No. 138, 141 and 144) and "+" represents magnets employing La and Sm as R (Sample No. 139, 142 and 145). The sintered ferrite magnets of Sample No. 82-84 and 137-145 all correspond to examples of the invention.

TABLE 11

| Sample No. | R x | R | (Non-La R)/R | Ca m | Sr 1 − x − m | Fe (12 − y)z | Co yz | z | 12z | y | R/Co x/yz |
|---|---|---|---|---|---|---|---|---|---|---|---|
| 13 | 0.39 | La | 0/0.39 | 0.20 | 0.41 | 11.70 | 0.30 | 1.00 | 12.00 | 0.30 | 1.30 |
| 82 | 0.39 | La + Pr | 0.04/0.39 | 0.20 | 0.41 | 11.70 | 0.30 | 1.00 | 12.00 | 0.30 | 1.30 |
| 137 | 0.39 | La + Nd | 0.02/0.39 | 0.20 | 0.41 | 11.70 | 0.30 | 1.00 | 12.00 | 0.30 | 1.30 |
| 138 | 0.39 | La + Ce | 0.01/0.39 | 0.20 | 0.41 | 11.70 | 0.30 | 1.00 | 12.00 | 0.30 | 1.30 |
| 139 | 0.39 | La + Sm | 0.01/0.39 | 0.20 | 0.41 | 11.70 | 0.30 | 1.00 | 12.00 | 0.30 | 1.30 |
| 25 | 0.33 | La | 0/0.33 | 0.17 | 0.51 | 11.75 | 0.25 | 1.00 | 12.00 | 0.25 | 1.30 |
| 83 | 0.33 | La + Pr | 0.04/0.33 | 0.17 | 0.51 | 11.75 | 0.25 | 1.00 | 12.00 | 0.25 | 1.30 |
| 140 | 0.33 | La + Nd | 0.02/0.33 | 0.17 | 0.51 | 11.75 | 0.25 | 1.00 | 12.00 | 0.25 | 1.30 |
| 141 | 0.33 | La + Ce | 0.01/0.33 | 0.17 | 0.51 | 11.75 | 0.25 | 1.00 | 12.00 | 0.25 | 1.30 |
| 142 | 0.33 | La + Sm | 0.01/0.33 | 0.17 | 0.51 | 11.75 | 0.25 | 1.00 | 12.00 | 0.25 | 1.30 |
| 26 | 0.26 | La | 0/0.26 | 0.13 | 0.61 | 11.80 | 0.20 | 1.00 | 12.00 | 0.20 | 1.30 |
| 84 | 0.26 | La + Pr | 0.04/0.26 | 0.13 | 0.61 | 11.80 | 0.20 | 1.00 | 12.00 | 0.20 | 1.30 |
| 143 | 0.26 | La + Nd | 0.02/0.26 | 0.13 | 0.61 | 11.80 | 0.20 | 1.00 | 12.00 | 0.20 | 1.30 |
| 144 | 0.26 | La + Ce | 0.01/0.26 | 0.13 | 0.61 | 11.80 | 0.20 | 1.00 | 12.00 | 0.20 | 1.30 |
| 145 | 0.26 | La + Sm | 0.01/0.26 | 0.13 | 0.61 | 11.80 | 0.20 | 1.00 | 12.00 | 0.20 | 1.30 |

TABLE 12

| Sample No. | R x | R | (Non-La R)/R | Ca m | Sr 1 − x − m | Fe (12 − y)z | Co yz | z | 12z | y | R/Co x/yz | SiO$_2$ wt % | Ca/Si |
|---|---|---|---|---|---|---|---|---|---|---|---|---|---|
| 13 | 0.35 | La | 0/0.35 | 0.29 | 0.37 | 10.45 | 0.27 | 0.89 | 10.71 | 0.30 | 1.30 | 0.60 | 3.40 |
| 82 | 0.35 | La + Pr | 0.04/0.35 | 0.29 | 0.37 | 10.45 | 0.27 | 0.89 | 10.71 | 0.30 | 1.30 | 0.60 | 3.40 |
| 137 | 0.35 | La + Nd | 0.02/0.35 | 0.29 | 0.37 | 10.45 | 0.27 | 0.89 | 10.71 | 0.30 | 1.30 | 0.60 | 3.40 |
| 138 | 0.35 | La + Ce | 0.01/0.35 | 0.29 | 0.37 | 10.45 | 0.27 | 0.89 | 10.71 | 0.30 | 1.30 | 0.60 | 3.40 |
| 139 | 0.35 | La + Sm | 0.01/0.35 | 0.29 | 0.37 | 10.45 | 0.27 | 0.89 | 10.71 | 0.30 | 1.30 | 0.60 | 3.40 |
| 25 | 0.29 | La | 0/0.29 | 0.26 | 0.45 | 10.49 | 0.22 | 0.89 | 10.71 | 0.25 | 1.30 | 0.60 | 3.10 |
| 83 | 0.29 | La + Pr | 0.04/0.29 | 0.26 | 0.45 | 10.49 | 0.22 | 0.89 | 10.71 | 0.25 | 1.30 | 0.60 | 3.10 |
| 140 | 0.29 | La + Nd | 0.02/0.29 | 0.26 | 0.45 | 10.49 | 0.22 | 0.89 | 10.71 | 0.25 | 1.30 | 0.60 | 3.10 |
| 141 | 0.29 | La + Ce | 0.01/0.29 | 0.26 | 0.45 | 10.49 | 0.22 | 0.89 | 10.71 | 0.25 | 1.30 | 0.60 | 3.10 |
| 142 | 0.29 | La + Sm | 0.01/0.29 | 0.26 | 0.45 | 10.49 | 0.22 | 0.89 | 10.71 | 0.25 | 1.30 | 0.60 | 3.10 |
| 26 | 0.23 | La | 0/0.23 | 0.23 | 0.54 | 10.54 | 0.18 | 0.89 | 10.71 | 0.20 | 1.30 | 0.60 | 2.80 |
| 84 | 0.23 | La + Pr | 0.04/0.23 | 0.23 | 0.54 | 10.54 | 0.18 | 0.89 | 10.71 | 0.20 | 1.30 | 0.60 | 2.80 |
| 143 | 0.23 | La + Nd | 0.02/0.23 | 0.23 | 0.54 | 10.54 | 0.18 | 0.89 | 10.71 | 0.20 | 1.30 | 0.60 | 2.80 |
| 144 | 0.23 | La + Ce | 0.01/0.23 | 0.23 | 0.54 | 10.54 | 0.18 | 0.89 | 10.71 | 0.20 | 1.30 | 0.60 | 2.80 |
| 145 | 0.23 | La + Sm | 0.01/0.23 | 0.23 | 0.54 | 10.54 | 0.18 | 0.89 | 10.71 | 0.20 | 1.30 | 0.60 | 2.80 |

TABLE 13

| Sample No. | Density g/cm$^3$ | Average maximum diameter μm | Aspect ratio | HcJ Oe | Br G | Hk/HcJ % | Orientation % | Br + ⅓HcJ |
|---|---|---|---|---|---|---|---|---|
| 13 | 5.11 | 0.70 | 2.14 | 5679 | 4632 | 92 | 97.9 | 6525 |
| 82 | 5.11 | 0.64 | 2.24 | 5625 | 4615 | 94 | 98.4 | 6490 |
| 137 | 5.12 | 0.68 | 2.27 | 5377 | 4640 | 94 | 98.0 | 6432 |
| 138 | 5.12 | 0.69 | 2.33 | 5275 | 4636 | 95 | 98.0 | 6394 |
| 139 | 5.12 | 0.66 | 2.41 | 5294 | 4633 | 94 | 98.1 | 6398 |
| 25 | 5.11 | 0.69 | 2.08 | 5576 | 4615 | 93 | 97.8 | 6474 |
| 83 | 5.10 | 0.63 | 2.22 | 5589 | 4605 | 93 | 98.5 | 6468 |
| 140 | 5.10 | 0.59 | 2.25 | 5361 | 4620 | 92 | 97.9 | 6407 |
| 141 | 5.10 | 0.60 | 2.35 | 5300 | 4617 | 93 | 97.9 | 6384 |
| 142 | 5.10 | 0.57 | 2.40 | 5316 | 4614 | 94 | 98.0 | 6386 |
| 26 | 5.09 | 0.68 | 2.11 | 5334 | 4608 | 90 | 98.0 | 6386 |
| 84 | 5.09 | 0.56 | 2.24 | 5395 | 4609 | 93 | 98.3 | 6407 |
| 143 | 5.10 | 0.62 | 2.25 | 5293 | 4612 | 90 | 98.0 | 6376 |
| 144 | 5.09 | 0.61 | 2.36 | 5252 | 4601 | 95 | 98.0 | 6352 |
| 145 | 5.10 | 0.59 | 2.43 | 5268 | 4603 | 94 | 98.0 | 6359 |

As clearly seen in Table 13 and FIG. 7, the sintered ferrite magnets of the invention exhibited adequately superior magnetic properties even when a portion of the La was replaced with Pr, Nd, Ce or Sm.

(Sample No. 85-92, 101 and 102)

Figure 8:
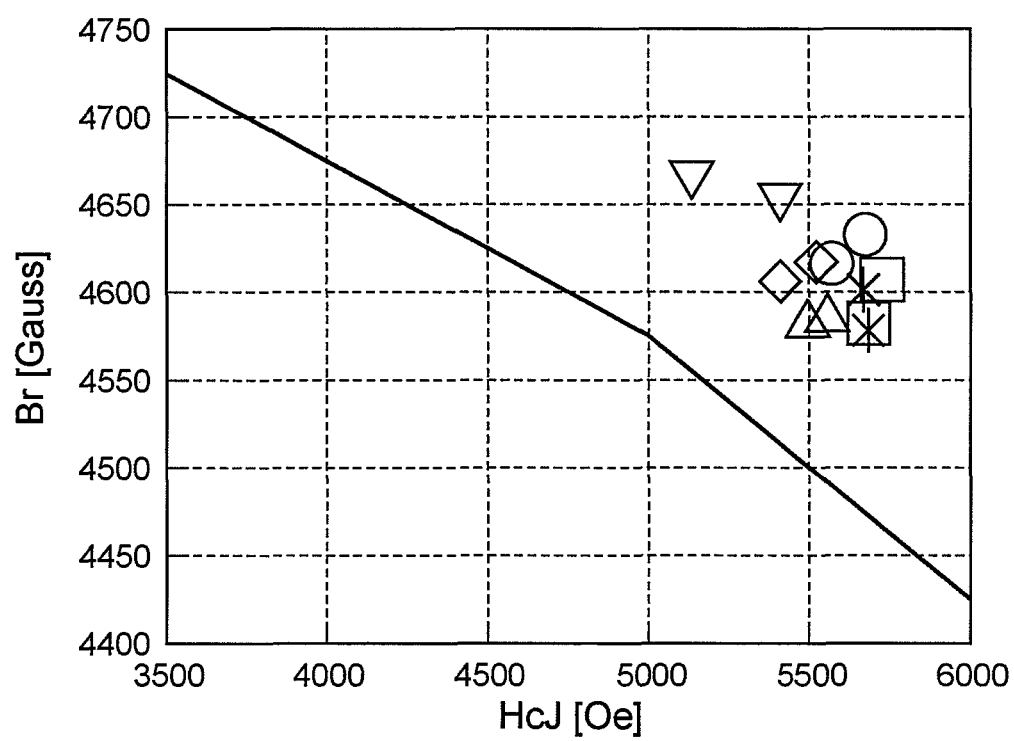
FIG. 8 is an HcJ-Br plot diagram for sintered ferrite magnets according to examples having different M compositions.

Sintered ferrite magnets for Sample No. 85-92, 101 and 102 were produced in the same manner as Sample No. 13, except that a portion of the Co was switched to Al, Cr, Ni, Mn or Zn for M. Table 14 shows the elemental compositions used in the mixing step, Table 15 shows the elemental compositions of the obtained sintered ferrite magnets, and Table 16 shows the physical properties and magnetic properties of the sintered ferrite magnets. FIG. 8 shows an HcJ-Br plot for the sintered ferrite magnets. In this drawing, "○" represents magnets employing only Co as M (Sample No. 13 and 25), "□" represents magnets employing Co and Al as M (Sample No. 85 and 89), "*" represents magnets employing Co and Cr as M (Sample No. 86 and 90), "Δ" represents magnets employing Co and Ni as M (Sample No. 87 and 91), "◇" represents magnets employing Co and Mn as M and "∇" represents magnets employing Co and Zn as M (Sample No. 101 and 102). The sintered ferrite magnets of Sample No. 85-92, 101 and 102 all correspond to examples of the invention.

TABLE 14

| Sample No. | La x | Ca m | Sr 1 − x − m | Fe (12 − y)z | M yz | M | (Non-Co M)/M | z | 12z | y | La/M x/yz |
|---|---|---|---|---|---|---|---|---|---|---|---|
| 13 | 0.39 | 0.20 | 0.41 | 11.70 | 0.30 | Co | 0/0.30 | 1.00 | 12.00 | 0.30 | 1.30 |
| 85 | 0.39 | 0.20 | 0.41 | 11.70 | 0.30 | Co + Al | 0.02/0.30 | 1.00 | 12.00 | 0.30 | 1.30 |
| 86 | 0.39 | 0.20 | 0.41 | 11.70 | 0.30 | Co + Cr | 0.02/0.30 | 1.00 | 12.00 | 0.30 | 1.30 |
| 87 | 0.39 | 0.20 | 0.41 | 11.70 | 0.30 | Co + Ni | 0.02/0.30 | 1.00 | 12.00 | 0.30 | 1.30 |
| 88 | 0.39 | 0.20 | 0.41 | 11.70 | 0.30 | Co + Mn | 0.02/0.30 | 1.00 | 12.00 | 0.30 | 1.30 |
| 101 | 0.39 | 0.20 | 0.41 | 11.70 | 0.30 | Co + Zn | 0.02/0.30 | 1.00 | 12.00 | 0.30 | 1.30 |
| 25 | 0.33 | 0.17 | 0.51 | 11.75 | 0.25 | Co | 0/0.25 | 1.00 | 12.00 | 0.25 | 1.30 |
| 89 | 0.39 | 0.20 | 0.41 | 11.70 | 0.30 | Co + Al | 0.05/0.30 | 1.00 | 12.00 | 0.30 | 1.30 |
| 90 | 0.39 | 0.20 | 0.41 | 11.70 | 0.30 | Co + Cr | 0.05/0.30 | 1.00 | 12.00 | 0.30 | 1.30 |
| 91 | 0.39 | 0.20 | 0.41 | 11.70 | 0.30 | Co + Ni | 0.05/0.30 | 1.00 | 12.00 | 0.30 | 1.30 |
| 92 | 0.39 | 0.20 | 0.41 | 11.70 | 0.30 | Co + Mn | 0.05/0.30 | 1.00 | 12.00 | 0.30 | 1.30 |
| 102 | 0.39 | 0.20 | 0.41 | 11.70 | 0.30 | Co + Zn | 0.05/0.30 | 1.00 | 12.00 | 0.30 | 1.30 |

TABLE 15

| Sample No. | La x | Ca m | Sr 1 − x − m | Fe (12 − y)z | M yz | M | (Non-Co M)/M | z | 12z | y | La/M x/yz | SiO$_2$ wt % | Ca/Si |
|---|---|---|---|---|---|---|---|---|---|---|---|---|---|
| 13 | 0.35 | 0.29 | 0.36 | 10.45 | 0.27 | Co | 0/0.27 | 0.89 | 10.71 | 0.30 | 1.30 | 0.60 | 3.40 |
| 85 | 0.35 | 0.29 | 0.36 | 10.45 | 0.27 | Ca + Al | 0.02/0.27 | 0.89 | 10.71 | 0.30 | 1.30 | 0.60 | 3.40 |
| 86 | 0.35 | 0.29 | 0.36 | 10.45 | 0.27 | Co + Cr | 0.02/0.27 | 0.89 | 10.71 | 0.30 | 1.30 | 0.60 | 3.40 |
| 87 | 0.35 | 0.29 | 0.36 | 10.45 | 0.27 | Ca + Ni | 0.02/0.27 | 0.89 | 10.71 | 0.30 | 1.30 | 0.60 | 3.40 |
| 88 | 0.35 | 0.29 | 0.36 | 10.45 | 0.27 | Co + Mn | 0.02/0.27 | 0.89 | 10.71 | 0.30 | 1.30 | 0.60 | 3.40 |
| 101 | 0.35 | 0.29 | 0.36 | 10.45 | 0.27 | Ca + Zn | 0.02/0.27 | 0.89 | 10.71 | 0.30 | 1.30 | 0.60 | 3.40 |
| 25 | 0.29 | 0.26 | 0.45 | 10.49 | 0.22 | Co | 0/0.22 | 0.89 | 10.71 | 0.25 | 1.30 | 0.60 | 3.10 |
| 89 | 0.35 | 0.29 | 0.36 | 10.45 | 0.27 | Ca + Al | 0.05/0.27 | 0.89 | 10.71 | 0.30 | 1.30 | 0.60 | 3.40 |
| 90 | 0.35 | 0.29 | 0.36 | 10.45 | 0.27 | Ca + Cr | 0.05/0.27 | 0.89 | 10.71 | 0.30 | 1.30 | 0.60 | 3.40 |
| 91 | 0.35 | 0.29 | 0.36 | 10.45 | 0.27 | Co + Ni | 0.05/0.27 | 0.89 | 10.71 | 0.30 | 1.30 | 0.60 | 3.40 |
| 92 | 0.35 | 0.29 | 0.36 | 10.45 | 0.27 | Co + Mn | 0.05/0.27 | 0.89 | 10.71 | 0.30 | 1.30 | 0.60 | 3.40 |
| 102 | 0.35 | 0.29 | 0.36 | 10.45 | 0.27 | Co + Zn | 0.05/0.27 | 0.89 | 10.71 | 0.30 | 1.30 | 0.60 | 3.40 |

TABLE 16

| Sample No. | Density g/cm$^3$ | Average maximum diameter μm | Aspect ratio | HcJ Oe | Br G | Hk/HcJ % | Orientation % | Br + ⅓HcJ |
|---|---|---|---|---|---|---|---|---|
| 13 | 5.11 | 0.70 | 2.14 | 5679 | 4632 | 92 | 97.9 | 6525 |
| 85 | 5.10 | 0.61 | 2.12 | 5731 | 4606 | 93 | 98.0 | 6516 |
| 86 | 5.11 | 0.60 | 2.11 | 5676 | 4601 | 92 | 97.8 | 6493 |
| 87 | 5.12 | 0.59 | 2.17 | 5555 | 4588 | 90 | 98.0 | 6440 |
| 88 | 5.11 | 0.54 | 2.21 | 5522 | 4617 | 91 | 97.9 | 6458 |
| 101 | 5.11 | 0.63 | 2.16 | 5413 | 4651 | 91 | 98.0 | 6455 |
| 25 | 5.11 | 0.69 | 2.08 | 5576 | 4615 | 93 | 97.8 | 6474 |
| 89 | 5.10 | 0.58 | 2.13 | 5692 | 4582 | 92 | 98.1 | 6479 |
| 90 | 5.10 | 0.58 | 2.20 | 5683 | 4578 | 95 | 98.1 | 6472 |
| 91 | 5.12 | 0.59 | 2.17 | 5498 | 4585 | 91 | 98.1 | 6418 |
| 92 | 5.12 | 0.57 | 2.22 | 5412 | 4606 | 90 | 98.1 | 6410 |
| 102 | 5.11 | 0.62 | 2.23 | 5136 | 4663 | 93 | 98.1 | 6375 |

As clearly seen in Table 16, the sintered ferrite magnets of the invention exhibited adequately superior magnetic properties even when a portion of the Co was replaced with Al, Cr, Ni, Mn or Zn. Also, particularly high residual flux density Br was exhibited when a portion of the Co was replaced with Zn.

(Sample No. 93 and 94)

Sintered ferrite magnets for Sample No. 93 and 94 were obtained in the same manner as Sample No. 13, except that firing temperature in the firing step was changed to 1120° C. and 1100° C., respectively. Table 17 shows the physical properties and magnetic properties of the obtained sintered ferrite magnets. As seen by the results in Table 17, the sintered ferrite magnets of the invention exhibited adequate magnetic properties by having post-sintering densities of 5.05 g/cm$^3$ or greater even with increased firing temperatures. The sintered ferrite magnet of Sample No. 93 corresponds to an example of the invention, while the sintered ferrite magnet of Sample No. 94 corresponds to a comparative example.

TABLE 17

| Sample No. | Density g/cm$^3$ | Average maximum diameter μm | Aspect ratio | HcJ Oe | Br G | Hk/HcJ % | Orientation % | Br + ⅓HcJ |
|---|---|---|---|---|---|---|---|---|
| 13 | 5.11 | 0.70 | 2.14 | 5679 | 4632 | 92 | 97.9 | 6525 |
| 93 | 5.05 | 0.59 | 2.36 | 5554 | 4561 | 97 | 97.5 | 6412 |
| 94 | 5.03 | 0.56 | 2.48 | 5518 | 4422 | 97 | 97.0 | 6261 |

(Sample No. 103, 104 and 146-157)

Figure 12:
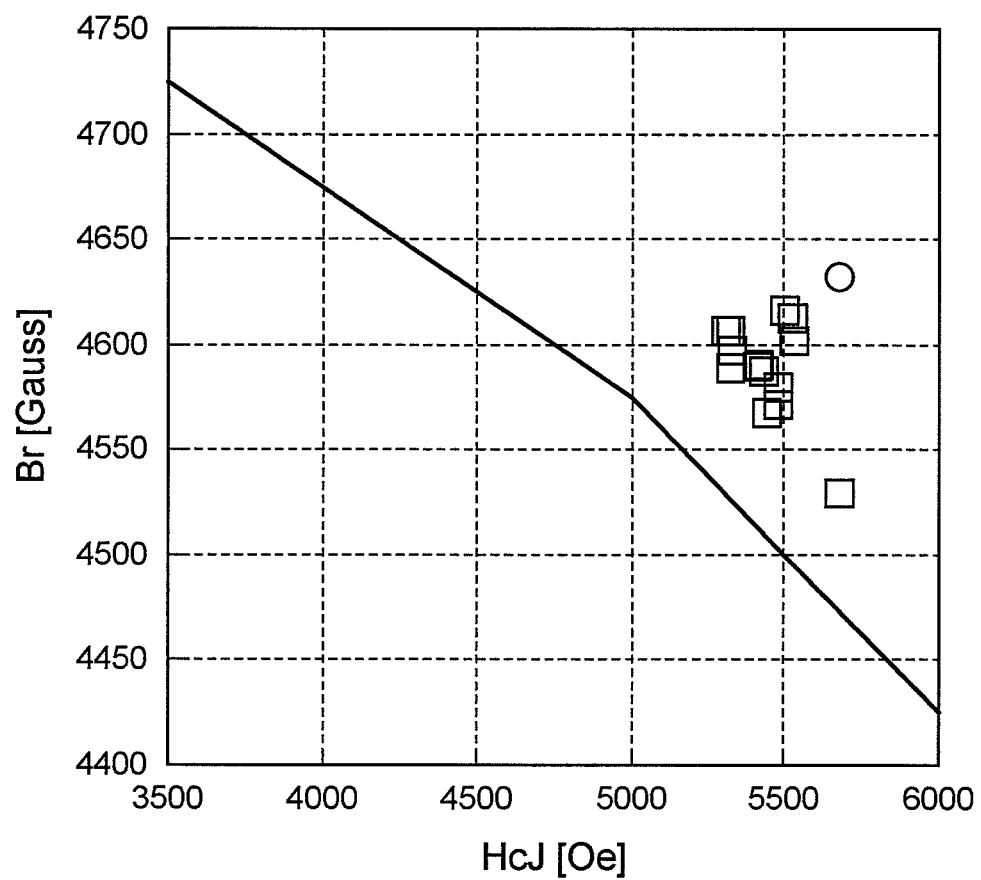
FIG. 12 is an HcJ-Br plot diagram for sintered ferrite magnets according to examples having different A compositions.

Sintered ferrite magnets for Sample No. 103, 104 and 146-157 were produced in the same manner as Sample No. 13, except that a portion of the Sr was switched to Ba for A. Table 18 shows the elemental compositions used in the mixing step, Table 19 shows the elemental compositions of the obtained sintered ferrite magnets, and Table 20 shows the physical properties and magnetic properties of the sintered ferrite magnets. FIG. 12 shows an HcJ-Br plot for the sintered ferrite magnets. In the drawing, "○" represents a sample employing only Sr as A (Sample No. 13) and "Δ" represents samples employing Sr and Ba as A (Sample No. 103, 104 and 146-157). The sintered ferrite magnets of Sample No. 103, 104 and 146-157 all correspond to examples of the invention.

TABLE 18

| Sample No. | La x | Ca m | A 1 − x − m | A Sr | A Ba | Fe (12 − y)z | Co yz | z | 12z | y | La/Co x/yz |
|---|---|---|---|---|---|---|---|---|---|---|---|
| 13 | 0.39 | 0.20 | 0.41 | 0.41 | 0 | 11.70 | 0.30 | 1.00 | 12.00 | 0.30 | 1.30 |
| 146 | 0.33 | 0.25 | 0.42 | 0.40 | 0.02 | 11.70 | 0.30 | 1.00 | 12.00 | 0.30 | 1.10 |
| 147 | 0.39 | 0.25 | 0.36 | 0.34 | 0.02 | 11.70 | 0.30 | 1.00 | 12.00 | 0.30 | 1.30 |
| 148 | 0.45 | 0.25 | 0.30 | 0.28 | 0.02 | 11.70 | 0.30 | 1.00 | 12.00 | 0.30 | 1.50 |
| 149 | 0.39 | 0.20 | 0.41 | 0.39 | 0.02 | 11.70 | 0.30 | 1.00 | 12.00 | 0.30 | 1.30 |
| 150 | 0.33 | 0.15 | 0.52 | 0.42 | 0.10 | 11.70 | 0.30 | 1.00 | 12.00 | 0.30 | 1.10 |
| 151 | 0.39 | 0.15 | 0.46 | 0.36 | 0.10 | 11.70 | 0.30 | 1.00 | 12.00 | 0.30 | 1.30 |
| 152 | 0.45 | 0.15 | 0.40 | 0.30 | 0.10 | 11.70 | 0.30 | 1.00 | 12.00 | 0.30 | 1.50 |
| 153 | 0.33 | 0.20 | 0.47 | 0.37 | 0.10 | 11.70 | 0.30 | 1.00 | 12.00 | 0.30 | 1.10 |
| 103 | 0.39 | 0.20 | 0.41 | 0.31 | 0.10 | 11.70 | 0.30 | 1.00 | 12.00 | 0.30 | 1.30 |
| 154 | 0.45 | 0.20 | 0.35 | 0.25 | 0.10 | 11.70 | 0.30 | 1.00 | 12.00 | 0.30 | 1.50 |
| 155 | 0.33 | 0.25 | 0.42 | 0.32 | 0.10 | 11.70 | 0.30 | 1.00 | 12.00 | 0.30 | 1.10 |
| 156 | 0.39 | 0.25 | 0.36 | 0.26 | 0.10 | 11.70 | 0.30 | 1.00 | 12.00 | 0.30 | 1.30 |
| 157 | 0.45 | 0.25 | 0.30 | 0.20 | 0.10 | 11.70 | 0.30 | 1.00 | 12.00 | 0.30 | 1.50 |
| 104 | 0.39 | 0.20 | 0.41 | 0.21 | 0.20 | 11.70 | 0.30 | 1.00 | 12.00 | 0.30 | 1.30 |

TABLE 19

| Sample No. | La x | Ca m | A 1 − x − m | A Sr | A Ba | Fe (12 − y)z | Co yz | z | 12z | y | La/Co x/yz | SiO$_2$ wt % | Ca/Si |
|---|---|---|---|---|---|---|---|---|---|---|---|---|---|
| 13 | 0.35 | 0.29 | 0.36 | 0.36 | 0 | 10.45 | 0.27 | 0.89 | 10.71 | 0.30 | 1.30 | 0.60 | 3.40 |
| 146 | 0.29 | 0.33 | 0.38 | 0.36 | 0.02 | 10.45 | 0.27 | 0.89 | 10.71 | 0.30 | 1.10 | 0.60 | 3.80 |
| 147 | 0.35 | 0.33 | 0.32 | 0.30 | 0.02 | 10.45 | 0.27 | 0.89 | 10.71 | 0.30 | 1.30 | 0.60 | 3.80 |
| 148 | 0.40 | 0.33 | 0.27 | 0.25 | 0.02 | 10.45 | 0.27 | 0.89 | 10.71 | 0.30 | 1.50 | 0.60 | 3.80 |
| 149 | 0.35 | 0.29 | 0.36 | 0.34 | 0.02 | 10.45 | 0.27 | 0.89 | 10.71 | 0.30 | 1.30 | 0.60 | 3.40 |
| 150 | 0.29 | 0.24 | 0.47 | 0.38 | 0.09 | 10.45 | 0.27 | 0.89 | 10.71 | 0.30 | 1.10 | 0.60 | 2.86 |
| 151 | 0.35 | 0.24 | 0.41 | 0.32 | 0.09 | 10.45 | 0.27 | 0.89 | 10.71 | 0.30 | 1.30 | 0.60 | 2.86 |
| 152 | 0.40 | 0.24 | 0.36 | 0.27 | 0.09 | 10.45 | 0.27 | 0.89 | 10.71 | 0.30 | 1.50 | 0.60 | 2.86 |
| 153 | 0.29 | 0.29 | 0.42 | 0.33 | 0.09 | 10.45 | 0.27 | 0.89 | 10.71 | 0.30 | 1.10 | 0.60 | 3.40 |
| 103 | 0.35 | 0.29 | 0.36 | 0.27 | 0.09 | 10.45 | 0.27 | 0.89 | 10.71 | 0.30 | 1.30 | 0.60 | 3.40 |
| 154 | 0.40 | 0.29 | 0.31 | 0.22 | 0.09 | 10.45 | 0.27 | 0.89 | 10.71 | 0.30 | 1.50 | 0.60 | 3.40 |
| 155 | 0.29 | 0.33 | 0.38 | 0.29 | 0.09 | 10.45 | 0.27 | 0.89 | 10.71 | 0.30 | 1.10 | 0.60 | 3.80 |
| 156 | 0.35 | 0.33 | 0.32 | 0.23 | 0.09 | 10.45 | 0.27 | 0.89 | 10.71 | 0.30 | 1.30 | 0.60 | 3.80 |
| 157 | 0.40 | 0.33 | 0.27 | 0.18 | 0.09 | 10.45 | 0.27 | 0.89 | 10.71 | 0.30 | 1.50 | 0.60 | 3.80 |
| 104 | 0.35 | 0.29 | 0.36 | 0.18 | 0.18 | 10.45 | 0.27 | 0.89 | 10.71 | 0.30 | 1.30 | 0.60 | 3.40 |

TABLE 20

| Sample No. | Density g/cm$^3$ | Average maximum diameter μm | Aspect ratio | HcJ Oe | Br G | Hk/HcJ % | Orientation % | Br + ⅓HcJ |
|---|---|---|---|---|---|---|---|---|
| 13 | 5.11 | 0.70 | 2.14 | 5679 | 4632 | 92 | 97.9 | 6525 |
| 146 | 5.12 | 0.59 | 2.12 | 5505 | 4616 | 95 | 97.8 | 6451 |
| 147 | 5.09 | 0.60 | 2.11 | 5309 | 4606 | 86 | 97.4 | 6376 |
| 148 | 5.12 | 0.64 | 2.15 | 5528 | 4612 | 88 | 97.7 | 6455 |
| 149 | 5.12 | 0.61 | 2.18 | 5420 | 4590 | 95 | 97.7 | 6397 |
| 150 | 5.11 | 0.56 | 2.18 | 5325 | 4606 | 87 | 97.5 | 6381 |
| 151 | 5.12 | 0.55 | 2.23 | 5333 | 4597 | 93 | 97.8 | 6375 |
| 152 | 5.14 | 0.57 | 2.25 | 5480 | 4571 | 92 | 97.7 | 6398 |
| 153 | 5.11 | 0.56 | 2.13 | 5414 | 4589 | 89 | 97.6 | 6394 |
| 103 | 5.13 | 0.58 | 2.27 | 5537 | 4601 | 92 | 97.5 | 6447 |
| 154 | 5.14 | 0.56 | 2.20 | 5434 | 4587 | 93 | 97.7 | 6398 |
| 155 | 5.11 | 0.56 | 2.16 | 5483 | 4579 | 88 | 97.4 | 6407 |
| 156 | 5.13 | 0.57 | 2.22 | 5682 | 4529 | 88 | 97.8 | 6423 |
| 157 | 5.14 | 0.60 | 2.23 | 5448 | 4567 | 97 | 97.6 | 6383 |
| 104 | 5.16 | 0.57 | 2.29 | 5323 | 4588 | 93 | 97.1 | 6362 |

As clearly seen in Table 20, the sintered ferrite magnets of the invention exhibited adequately superior magnetic properties even when a portion of the Sr was replaced by Ba.

[Effect of Aspect Ratio on Magnetic Property]

Figure 9:
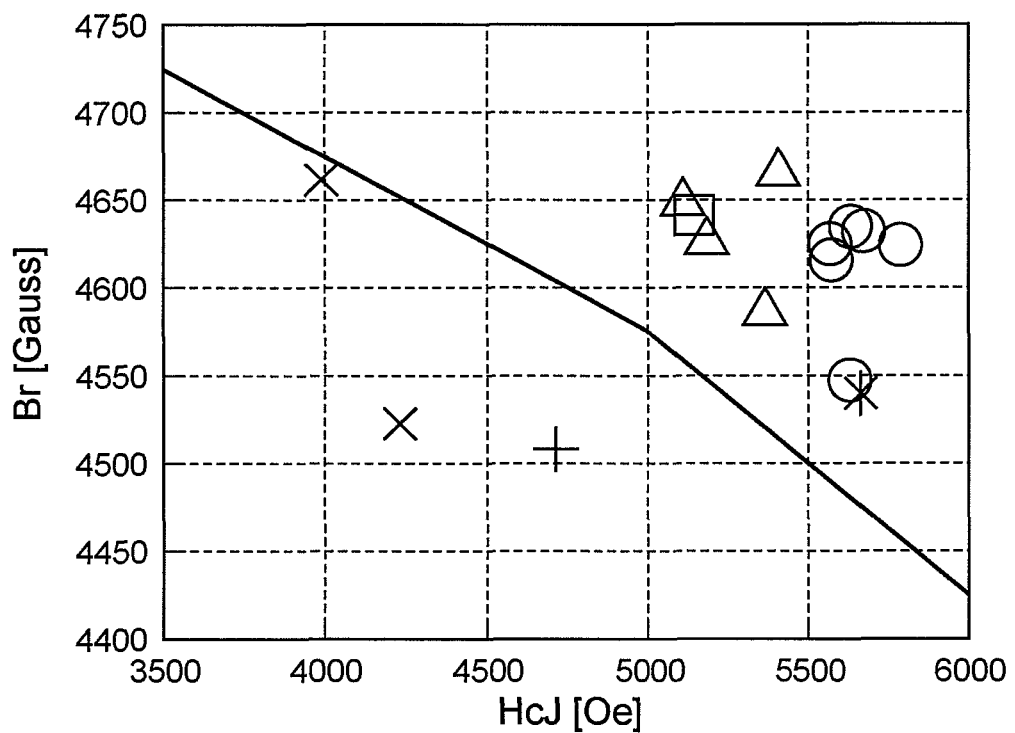
FIG. 9 is an HcJ-Br plot diagram for sintered ferrite magnets according to examples and comparative examples having different aspect ratios.

FIG. 9 shows an HcJ-Br plot for the aforementioned samples with different aspect ratios. In the plot, "□" represents samples with aspect ratios of 2.4-2.5, "△" represents samples with aspect ratios of 2.2-2.4, "○" represents samples with aspect ratios of 1.9-2.2 and "*" represents samples with aspect ratios of 1.8-1.9. All of these samples correspond to sintered ferrite magnets according to the examples of the invention. Also in the plot, "×" represents samples with an aspect ratio of 2.5, and "+" represents samples with an aspect ratio of less than 1.8. These samples correspond to sintered ferrite magnets according to comparative examples of the invention. As clearly seen in FIG. 9, sufficient magnetic properties are more difficult to obtain when the aspect ratio is outside of the range of the invention. That is, it is presumed that an aspect ratio of greater than 2.5 causes the average maximum diameter L of the crystal grains to exceed the single domain critical size and results in a wider demagnetizing field, thus lowering the coercive force HcJ and preventing the desired magnetic property from being obtained.

Figure 10:
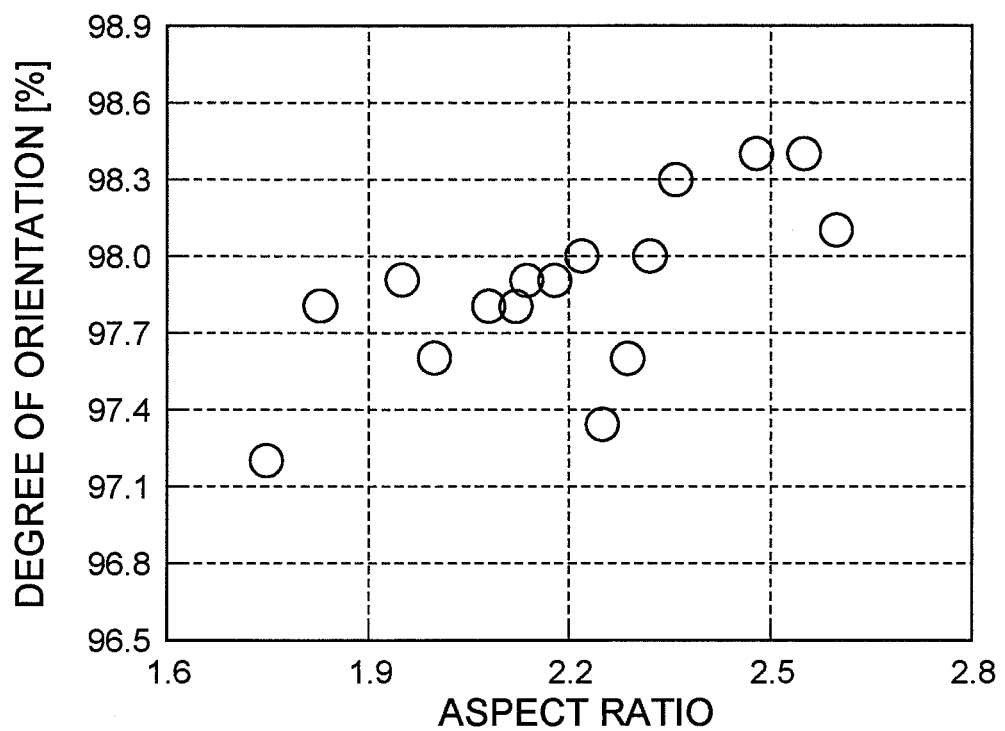
FIG. 10 is an HcJ-Br plot diagram for sintered ferrite magnets according to examples with different firing temperatures.

FIG. 10 is a plot diagram of the aspect ratio and degree of orientation, showing the dependency of the degree of orientation on the aspect ratio. According to the results in FIG. 10, the degree of orientation tends to increase with a higher aspect ratio. This is conjectured to be because, although growth of the crystal grains increases the aspect ratio in the sintered ferrite magnet sintering process, the grain growth occurs in a manner oriented along the c-axis direction of the crystal structure. That is, an aspect ratio of smaller than 1.8 reduces the degree of orientation and thus lowers the residual flux density Br, making it impossible to obtain the desired magnetic properties. Based on these results, the range for the aspect ratio L/S has been set to $1.8 \leq L/S \leq 2.5$.

The invention claimed is:

1. A sintered ferrite magnet having a ferrite phase with a hexagonal structure as the main phase, wherein the composition of the metal elements composing the main phase is represented by the following general formula (1):

(1)

wherein R represents at least one element selected from the group consisting of La, Ce, Pr, Nd and Sm and including La as an essential component, A represents Sr and/or Ba, and M represents at least one element selected from the group consisting of Co, Zn, Ni, Mn, Al and Cr and including Co as an essential component, x, m, y and z in formula (1) satisfying all of the conditions represented by the following formulas (2), (3), (4), (5) and (6):

$$0.2 \leq x \leq 0.5: \qquad (2)$$

$$0.13 \leq m \leq 0.41: \qquad (3)$$

$$0.7x - m \leq 0.15: \qquad (4)$$

$$0.18 \leq yz \leq 0.31: \qquad (5)$$

$$9.6 \leq 12z \leq 11.8: \qquad (6),$$

wherein the density of the sintered ferrite magnet is at least 5.05 g/cm³, and the crystal grains of the sintered ferrite magnet satisfy all of the conditions represented by the following formulas (7) and (8), where L μm is the average for the maximum value and S μm is the average for the minimum value among the diameters passing through the center of gravity of each grains in the crystal cross-section parallel to the c-axis direction of hexagonal structures, $$L \leq 0.95: \qquad (7)$$

$$1.8 \leq L/S \leq 2.5: \qquad (8).$$

2. The sintered ferrite magnet according to claim 1, wherein the sintered ferrite magnet is formed from a finely milled material having a mean particle size of 0.1-0.3 μm.